US006656866B2

(12) United States Patent
Wenzel et al.

(10) Patent No.: US 6,656,866 B2
(45) Date of Patent: Dec. 2, 2003

(54) CATALYST PREPARATION METHOD

(75) Inventors: Timothy T. Wenzel, Charleston, WV (US); David James Schreck, Cross Lanes, WV (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 09/729,842

(22) Filed: Dec. 4, 2000

(65) Prior Publication Data

US 2003/0207762 A9 Nov. 6, 2003

(51) Int. Cl.$^7$ .......................... B01J 31/00; B01J 37/00; C08F 4/02; C08F 4/60
(52) U.S. Cl. ........................................ 502/117
(58) Field of Search ......................... 502/117

(56) References Cited

U.S. PATENT DOCUMENTS

| | | | | |
|---|---|---|---|---|
| 5,672,669 A | * | 9/1997 | Wasserman et al. | 526/170 |
| 5,674,795 A | * | 10/1997 | Wasserman et al. | 502/9 |
| 5,889,128 A | * | 3/1999 | Schrock et al. | 526/107 |
| 6,271,165 B1 | * | 8/2001 | Jacobsen et al. | 502/104 |
| 6,274,684 B1 | * | 8/2001 | Loveday et al. | 526/114 |
| 6,281,306 B1 | * | 8/2001 | Oskam et al. | 526/161 |
| 6,346,584 B1 | * | 2/2002 | Wenzel et al. | 526/82 |
| 6,399,535 B1 | * | 6/2002 | Shih et al. | 502/167 |
| 6,399,722 B1 | * | 6/2002 | Szul et al. | 526/113 |

FOREIGN PATENT DOCUMENTS

EP  0668295 B1 * 8/1995 ............. C08F/2/44

* cited by examiner

Primary Examiner—Mark L. Bell
Assistant Examiner—Jennine Brown
(74) Attorney, Agent, or Firm—Lisa Kimes Jones; Kevin M. Faulkner

(57) ABSTRACT

The present invention relates to a method of preparing a supported catalyst system, the method including combining 1) a first supported catalyst system comprising a support, an activator and a metal catalyst compound, and 2) a second supported catalyst system comprising a support, an activator and a metal catalyst compound and thereafter spray-drying the combination.

24 Claims, 1 Drawing Sheet

CATALYST PREPARATION METHOD

FIELD OF THE INVENTION

This invention relates to spray dried olefin polymerization catalysts, methods for their production and their use in gas or slurry phase to produce polyolefins.

BACKGROUND OF THE INVENTION

The intense commercialization of metallocene polyolefin catalysts (metallocene being cyclopentadienyl based transition metal catalyst compounds) has led to widespread interest in the design of metallocene and non-metallocene, homogeneous catalysts, particularly for use in the economical gas and slurry phase processes. This field is more than an academic curiosity as new catalysts in gas or slurry phase may provide an easier, more economical pathway to currently available products and may also provide product and process opportunities which are beyond the capability of metallocene catalysts in the gas or slurry phase.

New catalysts, however, are not automatically useable in polymerization process, particularly a gas phase polymerization process. Some catalysts are too active for the gas phase and foul the reactor. Other catalysts cannot be supported and thus are difficult to introduced into the reactor in such as way that fouling does not occur.

There is also a drive in the art to develop more and more economical processes to produce what are traditionally called bi-modal polymers. These polymers typically show large concentrations of two or more polymer species on a Gel Permeation Chromatograph. (For our purposes, peaks and shoulders are thought to represent distinct species). These polymers are sought after because they can address several needs of individual industries at once. For example, in the film blowing industry, a polymer comprising a high molecular weight species that provides strength and a low molecular weight species that provides processability is highly desired. Blends of these two types of polymers tend to separate or have other miscibility problems. But polymers produced in one reactor having two or more molecular weight species do not have these problems to the same extent if at all. Typically these multimodal polymers are made by using two different catalysts in the same reactor or in a series of reactors. Thus, there is a desire in the art to produce new and more improved methods to obtain such multi-modal polymers and to make the production process more efficient.

Schrock et al in U.S. Pat. No. 5,889,128 discloses a process for the living polymerization of olefins in solution using initiators having a metal atom and a ligand having two group 15 atoms and a group 16 atom or three group 15 atoms. In particular, the solution phase polymerization of ethylene using $\{[NON]ZrMe\}[MeB(C_6F_5)_3]$ or $\{[NON]ZrMe(PhNMe_2)]\}[B(C_6F_5)_4]$ is disclosed in examples 9 and 10.

EP 893 454 A1 discloses unsupported transition metal amide compounds used in combination with activators to polymerize olefins in the solution phase.

Mitsui Chemicals, Inc. in EP 0 893 454 A1 discloses transition metal amides combined with activators to polymerize olefins.

EP 0 874 005 A1 discloses phenoxide compounds with an imine substituent for use as a polymerization catalyst.

EP 893 454 A1 discloses unsupported transition metal amide compounds used in combination with activators to polymerize olefins in the solution phase.

U.S. Ser. No. 09/312,878 filed May 17, 1999 discloses a gas or slurry phase polymerization process using a supported bisamide catalyst.

Japanese Abstract JP 10330416A appears to disclose transition metal amide catalysts in combination with Ziegler-Natta catalysts. Japanese Abstract JP 10330412A appears to disclose transition metal amide catalysts in combination with group 4 transition metal cyclopentadienyl catalysts.

Ethylenebis(salicylideneiminato)zirconium dichloride combined with methyl alumoxane deposited on a support and unsupported versions were used to polymerize ethylene by Repo et al in Macromolecules 1997, 30, 171–175.

U.S. Pat. Nos. 5,672,669, 674,795 and EP 0 668 295 B1 disclose spray dried filled metallocene catalyst compositions for use in gas phase polymerizations.

SUMMARY OF THE INVENTION

This invention relates to a method to prepare a supported catalyst system comprising preparing a combination comprising 1) a first supported catalyst system comprising a support, an activator and a metal catalyst compound, and 2) a second supported catalyst system comprising a support, an activator and a metal catalyst compound and thereafter spray-drying the combination.

DETAILED DESCRIPTION OF THE INVENTION

Figure 1:
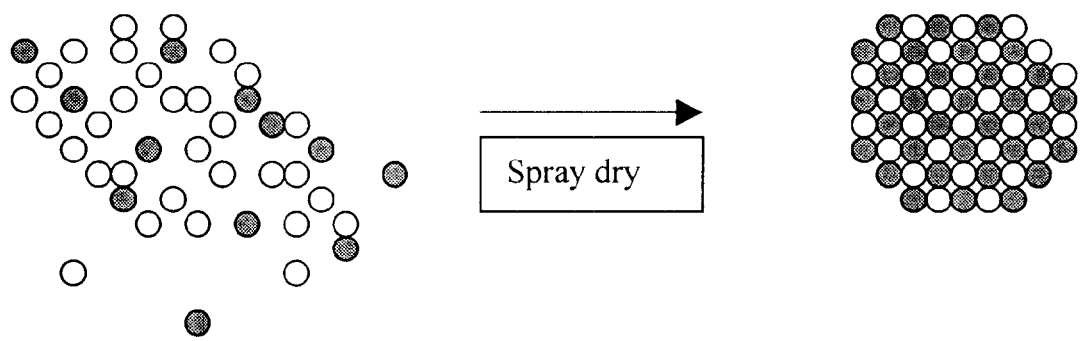
FIG. 1 is an illustration of the invention where Catalyst A particles (white) and catalyst B particles, each supported on a solid or semisolid, are spray dried together to form a composite particle.

In a preferred embodiment, the present invention relates to a method to prepare a supported catalyst system comprising combining a first supported catalyst system comprising a particulate filler, an activator and a metal catalyst compound with a second supported catalyst system comprising a particulate filler, an activator and a metal catalyst compound and thereafter spray-drying the combination. The particulate filler may be solid or semi-solid. For purpose of this invention and the claims thereto a catalyst system is defined to comprise at least one metal catalyst compound and at least one activator. The two catalysts systems preferably differ in some manner. For example, the two catalyst compounds may be different, the activators may be different, the concentrations of the components on the supports may be different, the size and or size of the particles formed by the individual catalyst systems and their supports may be different and the like.

When two different catalysts are used, the first and second catalyst compounds maybe used at molar ratios of 1:1000 to 1000:1, preferably 1:99 to 99:1, preferably 10:90 to 90:10, more preferably 20:80 to 80:20, more preferably 30:70 to 70:30, more preferably 40:60 to 60:40. The particular ratio chosen will depend on the end product desired. One practical method to determine which ratio is best to obtain the desired polymer is to start with a 1:1 ratio, measure the desired property in the product produced and adjust the ratio accordingly.

Metal Catalyst Compounds

This invention can be used in combination with any catalyst compound, activator and or catalyst system that can be supported. By supported is meant deposited on, contacted with, vaporized with, bonded to, or incorporated within, adsorbed or absorbed in, or on, a support or carrier including but not limited to particulate filler.

Preferred metal catalyst compounds that may be used herein include:

a) group 15 containing metal compounds (as described below);
b) phenoxide catalysts (as described below);
c) bulky ligand metallocene compounds (as described below); and
d) conventional type transition metal catalysts (as described below).

For purposes of this invention cyclopentadienyl group is defined to include indenyls and fluorenyls.

Group 15 Containing Metal Compound

The mixed catalyst composition of the present invention includes a Group 15 containing metal compound. The Group 15 containing compound generally includes a Group 3 to 14 metal atom, preferably a Group 3 to 7, more preferably a Group 4 to 6, and even more preferably a Group 4 metal atom, bound to at least one leaving group and also bound to at least two Group 15 atoms, at least one of which is also bound to a Group 15 or 16 atom through another group.

In one preferred embodiment, at least one of the Group 15 atoms is also bound to a Group 15 or 16 atom through another group which may be a $C_1$ to $C_{20}$ hydrocarbon group, a heteroatom containing group, silicon, germanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a cyclic group and may optionally be bound to hydrogen, a halogen, a heteroatom or a hydrocarbyl group, or a heteroatom containing group.

In a preferred embodiment, the Group 15 containing metal compound of the present invention may be represented by the formulae:

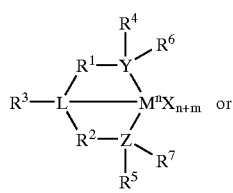

Formula I

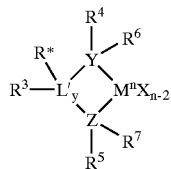

Formula II wherein

M is a Group 3 to 12 transition metal or a Group 13 or 14 main group metal, preferably a Group 4, 5, or 6 metal, and more preferably a Group 4 metal, and most preferably zirconium, titanium or hafnium, each X is independently a leaving group, preferably, an anionic leaving group, and more preferably hydrogen, a hydrocarbyl group, a hetero atom or a halogen, and most preferably an alkyl.

y is 0 or 1 (when y is 0 group L' is absent), n is the oxidation state of M, preferably +3, +4, or +5, and more preferably +4, m is the formal charge of the YZL or the YZL' ligand, preferably 0, −1, −2 or −3, and more preferably −2, L is a Group 15 or 16 element, preferably nitrogen, L' is a Group 15 or 16 element or Group 14 containing group, preferably carbon, silicon or germanium, Y is a Group 15 element, preferably nitrogen or phosphorus, and more preferably nitrogen, Z is a Group 15 element, preferably nitrogen or phosphorus, and more preferably nitrogen, $R^1$ and $R^2$ are independently a $C_1$ to $C_{20}$ hydrocarbon group, a heteroatom containing group having up to twenty carbon atoms, silicon, germanium, tin, lead, halogen or phosphorus, preferably a $C_2$ to $C_{20}$ alkyl, aryl or aralkyl group, more preferably a linear, branched or cyclic $C_2$ to $C_{20}$ alkyl group, most preferably a $C_2$ to $C_6$ hydrocarbon group. $R^1$ and $R^2$ may also be interconnected to each other.

$R^3$ is absent or a hydrocarbon group, hydrogen, a halogen, a heteroatom containing group, preferably a linear, cyclic or branched alkyl group having 1 to 20 carbon atoms, more preferably $R^3$ is absent, hydrogen or an alkyl group, and most preferably hydrogen $R^4$ and $R^5$ are independently an alkyl group, an aryl group, substituted aryl group, a cyclic alkyl group, a substituted cyclic alkyl group, a cyclic aralkyl group, a substituted cyclic aralkyl group or multiple ring system, preferably having up to 20 carbon atoms, more preferably between 3 and 10 carbon atoms, and even more preferably a $C_1$ to $C_{20}$ hydrocarbon group, a $C_1$ to $C_{20}$ aryl group or a $C_1$ to $C_{20}$ aralkyl group, or a heteroatom containing group, for example $PR_3$, where R is an alkyl group, $R^1$ and $R^2$ may be interconnected to each other, and/or $R^4$ and $R^5$ may be interconnected to each other, $R^6$ and $R^7$ are independently absent, or hydrogen, an alkyl group, halogen, heteroatom or a hydrocarbyl group, preferably a linear, cyclic or branched alkyl group having 1 to 20 carbon atoms, more preferably absent, and $R^*$ is absent, or is hydrogen, a Group 14 atom containing group, a halogen, or a heteroatom containing group.

By "formal charge of the YZL or YZL' ligand", it is meant the charge of the entire ligand absent the metal and the leaving groups X.

By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups.

An alkyl group may be a linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. An aralkyl group is defined to be a substituted aryl group.

In a preferred embodiment $R^4$ and $R^5$ are independently a group represented by the following formula:

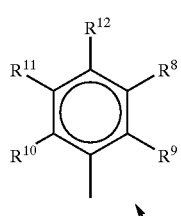

Formula 1

Bond to Z or Y wherein

R$^8$ to R$^{12}$ are each independently hydrogen, a C$_1$ to C$_{40}$ alkyl group, a halide, a heteroatom, a heteroatom containing group containing up to 40 carbon atoms, preferably a C$_1$ to C$_{20}$ linear or branched alkyl group, preferably a methyl, ethyl, propyl or butyl group, any two R groups may form a cyclic group and/or a heterocyclic group. The cyclic groups may be aromatic. In a preferred embodiment R$^9$, R$^{10}$ and R$^{12}$ are independently a methyl, ethyl, propyl or butyl group (including all isomers), in a preferred embodiment R$^9$, R$^{10}$ and R$^{12}$ are methyl groups, and R$^8$ and R$^{11}$ are hydrogen.

In a particularly preferred embodiment R$^4$ and R$^5$ are both a group represented by the following formula:

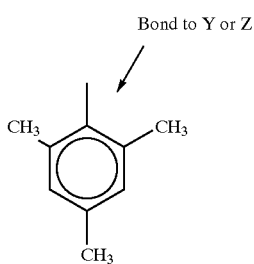

Formula 2

In this embodiment, M is a Group 4 metal, preferably zirconium, titanium or hafnium, and even more preferably zirconium; each of L, Y, and Z is nitrogen; each of R$^1$ and R$^2$ is —CH$_2$—CH$_2$—; R$^3$ is hydrogen; and R$^6$ and R$^7$ are absent.

In a particularly preferred embodiment the Group 15 containing metal compound is represented by the formula:

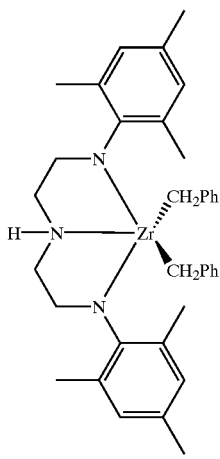

Compound I

In compound I, Ph equals phenyl.

The Group 15 containing metal compounds of the invention are prepared by methods known in the art, such as those disclosed in EP 0 893 454 A1, U.S. Pat. No. 5,889,128 and the references cited in U.S. Pat. No. 5,889,128 which are all herein incorporated by reference. U.S. application Ser. No. 09/312,878, filed May 17, 1999, discloses a gas or slurry phase polymerization process using a supported bisamide catalyst, which is also incorporated herein by reference.

A preferred direct synthesis of these compounds comprises reacting the neutral ligand, (see for example YZL or YZL' of formula 1 or 2) with M$^n$X$_n$ (M is a Group 3 to 14 metal, n is the oxidation state of M, each X is an anionic group, such as halide, in a non-coordinating or weakly coordinating solvent, such as ether, toluene, xylene, benzene, methylene chloride, and/or hexane or other solvent having a boiling point above 60° C., at about 20 to about 150° C. (preferably 20 to 100° C.), preferably for 24 hours or more, then treating the mixture with an excess (such as four or more equivalents) of an alkylating agent, such as methyl magnesium bromide in ether. The magnesium salts are removed by filtration, and the metal complex isolated by standard techniques.

In one embodiment the Group 15 containing metal compound is prepared by a method comprising reacting a neutral ligand, (see for example YZL or YZL' of formula 1 or 2) with a compound represented by the formula M$^n$X$_n$ (where M is a Group 3 to 14 metal, n is the oxidation state of M, each X is an anionic leaving group) in a non-coordinating or weakly coordinating solvent, at about 20° C. or above, preferably at about 20 to about 100° C., then treating the mixture with an excess of an alkylating agent, then recovering the metal complex. In a preferred embodiment the solvent has a boiling point above 60° C., such as toluene, xylene, benzene, and/or hexane. In another embodiment the solvent comprises ether and/or methylene chloride, either being preferable.

For additional information of Group 15 containing metal compounds, please see Mitsui Chemicals, Inc. in EP 0 893 454 A1 which discloses transition metal amides combined with activators to polymerize olefins.

Preferred catalyst compounds include [(2,4,6-CH$_3$)$_3$C$_6$H$_2$)NCH$_2$CH$_2$]$_2$NH}MBz$_2$ (where M is Hf, Zr, Ti, and Bz is a halide or a benzyl group.

Phenoxide Catalysts

Another group of catalysts that may be used in the process of this invention include one or more catalysts represented by the following formulae:

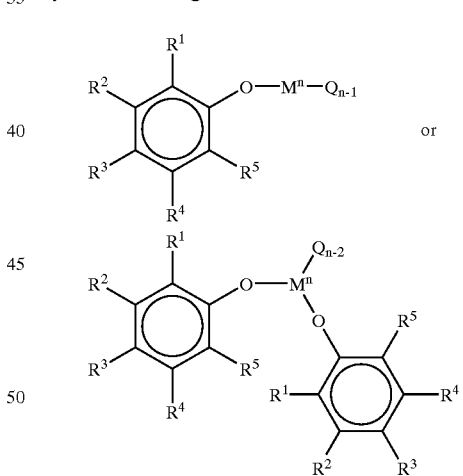

wherein R$^1$ is hydrogen or a C$_4$ to C$_{100}$ group, preferably a tertiary alkyl group, preferably a C$_4$ to C$_{20}$ alkyl group, preferably a C$_4$ to C$_{20}$ tertiary alkyl group, preferably a neutral C$_4$ to C$_{100}$ group and may or may not also be bound to M, and at least one of R$^2$ to R$^5$ is a group containing a heteroatom, the rest of R$^2$ to R$^5$ are independently hydrogen or a C$_1$ to C$_{100}$ group, preferably a C$_4$ to C$_{20}$ alkyl group (preferably butyl, isobutyl, pentyl hexyl, heptyl, isohexyl, octyl, isooctyl, decyl, nonyl, dodecyl ) and any of R$^2$ to R$^5$ also may or may not be bound to M, O is oxygen, M is a group 3 to group 10 transition metal or lanthanide metal, preferably a group 4 metal, preferably Ti, Zr or Hf, n is the valence state of the metal M, preferably 2, 3, 4, or 5, Q is an alkyl, halogen, benzyl, amide, carboxylate, carbamate, thiolate, hydride or alkoxide group, or a bond to an R group containing a heteroatom which may be any of $R^1$ to $R^5$ A heteroatom containing group may be any heteroatom or a heteroatom bound to carbon silica or another heteroatom. Preferred heteroatoms include boron, aluminum, silicon, nitrogen, phosphorus, arsenic, tin, lead, antimony, oxygen, selenium, tellurium. Particularly preferred heteroatoms include nitrogen, oxygen, phosphorus, and sulfur. Even more particularly preferred heteroatoms include oxygen and nitrogen. The heteroatom itself may be directly bound to the phenoxide ring or it may be bound to another atom or atoms that are bound to the phenoxide ring. The heteroatom containing group may contain one or more of the same or different heteroatoms. Preferred heteroatom groups include imines, amines, oxides, phosphines, ethers, ketenes, oxoazolines heterocyclics, oxazolines, thioethers, and the like. Particularly preferred heteroatom groups include imines. Any two adjacent R groups may form a ring structure, preferably a 5 or 6 membered ring. Likewise the R groups may form multi-ring structures. In one embodiment any two or more R groups do not form a 5 membered ring.

These phenoxide catalysts may be activated with activators including alkyl aluminum compounds (such as diethylaluminum chloride), alumoxanes, modified alumoxanes, non-coordinating anions, non-coordinating group 13 metal or metalliod anions, boranes, borates and the like. For further information on activators please see the Activator section below.

This invention may also be practiced with the catalysts disclosed in EP 0 874 005 A1, which in incorporated by reference herein.

Preferred phenoxide compounds include:

bis(N-methyl-3,5-di-t-butylsalicylimino)zirconium(IV) dibenzyl;
bis(N-ethyl-3,5-di-t-butylsalicylimino)zirconium(IV) dibenzyl;
bis(N-iso-propyl-3,5-di-t-butylsalicylimino)zirconium(IV) dibenzyl;
bis(N-t-butyl-3,5-di-t-butylsalicylimino)zirconium(IV) dibenzyl;
bis(N-benzyl-3,5-di-t-butylsalicylimino)zirconium(IV) dibenzyl;
bis(N-hexyl-3,5-di-t-butylsalicylimino)zirconium(IV) dibenzyl;
bis(N-phenyl-3,5-di-t-butylsalicylimino)zirconium(IV) dibenzyl;
bis(N-methyl-3,5-di-t-butylsalicylimino)zirconium(IV) dibenzyl;
bis(N-benzyl-3,5-di-t-butylsalicylimino)zirconium(IV) dichloride;
bis(N-benzyl-3,5-di-t-butylsalicylimino)zirconium(IV) dipivalate;
bis(N-benzyl-3,5-di-t-butylsalicylimino)titanium(IV) dipivalate;
bis(N-benzyl-3,5-di-t-butylsalicylimino)zirconium(IV)di (bis(dimethylamide));
bis(N-iso-propyl-3,5-di-t-amylsalicylimino)zirconium(IV) dibenzyl;
bis(N-iso-propyl-3,5-di-t-octylsalicylimino)zirconium(IV) dibenzyl;
bis(N-iso-propyl-3,5-di-(1',1'-dimethyl benzyl)salicylimino) zirconium(IV)dibenzyl;
bis(N-iso-propyl-3,5-di-(1',1'-dimethylbenzyl)salicylimino) titanium(IV)dibenzyl;
bis(N-iso-propyl-3,5-di-(1',1'-dimethylbenzyl)salicylimino) hafnium(IV)dibenzyl;
bis(N-iso-butyl-3,5-di-(1',1'-dimethylbenzyl)salicylimino) zirconium(IV)dibenzyl;
bis(N-iso-butyl-3,5-di-(1',1'-dimethylbenzyl)salicylimino) zirconium(IV)dichloride;
bis(N-hexyl-3,5-di-(1',1'-dimethylbenzyl)salicylimino) zirconium(IV)dibenzyl;
bis(N-phenyl-3,5-di-(1',1'-dimethylbenzyl)salicylimino) zirconium(IV)dibenzyl;
bis(N-iso-propyl-3,5-di-(1'-methylcyclohexyl)salicylimino) zirconium(IV)dibenzyl;
bis(N-benzyl-3-t-butylsalicylimino)zirconium(IV)dibenzyl;
bis(N-benzyl-3-triphenylmethylsalicylimino)zirconium(IV) dibenzyl;
bis(N-iso-propyl-3,5-di-trimethylsilylsalicylimino) zirconium(IV)dibenzyl;
bis(N-iso-propyl-3-(phenyl)salicylimino)zirconium(IV) dibenzyl;
bis(N-benzyl-3-(2',6'-di-iso-propylphenyl)salicylimino) zirconium(IV)dibenzyl;
bis(N-benzyl-3-(2',6'-di-phenylphenyl)salicylimino) zirconium(IV)dibenzyl;
bis(N-benzyl-3-t-butyl-5-methoxysalicylimino)zirconium (IV)dibenzyl;
bis(2-(2H-benzotriazol-2-yl)-4,6-di-t-amylphenoxide) zirconium(IV)dibenzyl;
bis(2-(2H-benzotriazol-2-yl)-4,6-di-t-amylphenoxide) zirconium(IV)dichloride;
bis(2-(2H-benzotriazol-2-yl)-4,6-di-t-amylphenoxide) zirconium(IV)di(bis(dimethylamide));
bis(2-(2H-benzotriazol-2-yl)-4,6-di-(1',1'-dimethylbenzyl) phenoxide)zirconium(IV)dibenzyl;
bis(2-(2H-benzotriazol-2-yl)-4,6-di-t-amylphenoxide) titanium(IV)dibenzyl;
bis(2-(2H-benzotriazol-2-yl)-4,6-di-(1',1'-dimethylbenzyl) phenoxide)titanium(IV)dibenzyl;
bis(2-(2H-benzotriazol-2-yl)-4,6-di-(1',1'-dimethylbenzyl) phenoxide)titanium(IV)dichloride;
bis(2-(2H-benzotriazol-2-yl)-4,6-di-(1',1'-dimethylbenzyl) phenoxide)hafnium(IV)dibenzyl;
(N-phenyl-3,5-di-(1',1'-dimethylbenzyl)salicylimino) zirconium(IV)tribenzyl;
(N-(2',6'-di-iso-propylphenyl)-3,5-di-(1',1'-dimethylbenzyl) salicylimino)zirconium(IV)tribenzyl;
(N-(2',6'-di-iso-propylphenyl)-3,5-di-(1',1'-dimethylbenzyl) salicylimino)titanium(IV)tribenzyl; and
(N-(2',6'-di-iso-propylphenyl)-3,5-di-(1',1'-dimethylbenzyl) salicylimino)zirconium(IV)trichloride.

Bulky Ligand Metallocene-Type Compound

Bulky ligand metallocene-type compound (hereinafter also referred to as metallocenes) may also be used in the practice of this invention.

Generally, bulky ligand metallocene-type compounds include half and full sandwich compounds having one or more bulky ligands bonded to at least one metal atom. Typical bulky ligand metallocene-type compounds are generally described as containing one or more bulky ligand(s) and one or more leaving group(s) bonded to at least one metal atom. In one preferred embodiment, at least one bulky ligands is η-bonded to the metal atom, most preferably $\eta^5$-bonded to the metal atom.

The bulky ligands are generally represented by one or more open, acyclic, or fused ring(s) or ring system(s) or a combination thereof. These bulky ligands, preferably the ring(s) or ring system(s) are typically composed of atoms selected from Groups 13 to 16 atoms of the Periodic Table of Elements, preferably the atoms are selected from the group consisting of carbon, nitrogen, oxygen, silicon, sulfur, phosphorous, germanium, boron and aluminum or a combination thereof. Most preferably the ring(s) or ring system(s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, the bulky ligand metallocene-type catalyst compounds are represented by the formula:

$$L^A L^B M Q_n \qquad (III)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopenta-cyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of η-bonding to M, preferably $η^3$-bonding to M and most preferably $η^5$-bonding. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of formula (III) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis (difluoromethyl)silyl, bromomethyldimethylgermyl and the like; and disubstitiuted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. In one embodiment, Q is a monoanionic labile ligand having a sigma-bond to M. Depending on the oxidation state of the metal, the value for n is 0, 1 or 2 such that formula (III) above represents a neutral bulky ligand metallocene-type catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like.

The two L groups may be bridged together by group A as defined below.

In one embodiment, the bulky ligand metallocene-type catalyst compounds of the invention include those of formula (III) where $L^A$ and $L^B$ are bridged to each other by at least one bridging group, A, such that the formula is represented by $$L^A A L^B M Q_n \qquad (IV)$$

These bridged compounds represented by formula (IV) are known as bridged, bulky ligand metallocene-type catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by R'$_2$C, R'$_2$Si, R'$_2$Si R'$_2$Si, R'$_2$Ge, R'P, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene-type catalyst compounds of formula (IV) have two or more bridging groups A (EP 664 301 B1).

In one embodiment, the bulky ligand metallocene-type catalyst compounds are those where the R substituents on the bulky ligands $L^A$ and $L^B$ of formulas (III) and (IV) are substituted with the same or different number of substituents on each of the bulky ligands. In another embodiment, the bulky ligands $L^A$ and $L^B$ of formulas (III) and (IV) are different from each other.

Other bulky ligand metallocene-type catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517 and 5,939,503 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are herein fully incorporated by reference.

In one embodiment, bulky ligand metallocene-type catalysts compounds useful in the invention include bridged heteroatom, mono-bulky ligand metallocene-type compounds. These types of catalysts and catalyst systems are described in, for example, PCT publication WO 92/00333, WO 94/07928, WO 91/04257, WO 94/03506, WO96/00244, WO 97/15602 and WO 99/20637 and U.S. Pat. Nos. 5,057, 475, 5,096,867, 5,055,438, 5,198,401, 5,227,440 and 5,264, 405 and European publication EP-A-0 420 436, all of which are herein fully incorporated by reference.

In this embodiment, the bulky ligand metallocene-type catalyst compound is represented by the formula:

$$L^C AJMQ_n \qquad (V)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to $L^C$ and J; J is a heteroatom ancillary ligand; and A is a bridging group; Q is a univalent anionic ligand; and n is the integer 0, 1 or 2. In formula (V) above, $L^C$, A and J form a fused ring system. In an embodiment, $L^C$ of formula (V) is as defined above for $L^A$, A, M and Q of formula (V) are as defined above in formula (III).

In formula (V) J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred.

In an embodiment of the invention, the bulky ligand metallocene-type catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene-type catalyst compounds are described in WO 96/33202, WO 96/34021, WO 97/17379 and WO 98/22486 and EP-A1-0 874 005 and U.S. Pat. Nos. 5,637,660, 5,539,124, 5,554,775, 5,756,611, 5,233,049, 5,744,417, and 5,856,258 all of which are herein incorporated by reference.

In one embodiment, the bulky ligand metallocene-type catalyst compounds are those complexes known as transition metal catalysts based on bidentate ligands containing pyridine or quinoline moieties, such as those described in U.S. application Ser. No. 09/103,620 filed Jun. 23, 1998, which is herein incorporated by reference. In another embodiment, the bulky ligand metallocene-type catalyst compounds are those described in PCT publications WO 99/01481 and WO 98/42664, which are fully incorporated herein by reference.

In a preferred embodiment, the bulky ligand type metallocene-type catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In a particularly preferred embodiment, the other metal compound or second metal compound is the bulky ligand metallocene-type catalyst compound is represented by the formula:

$$L^D MQ_2(YZ)X_n \qquad (VI)$$

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and Q$_2$(YZ) forms a ligand, preferably a unicharged polydentate ligand; A or Q is a univalent anionic ligand also bonded to M; X is a univalent anionic group when n is 2 or X is a divalent anionic group when n is 1; n is 1 or 2.

In formula (VI), L and M are as defined above for formula (III). Q is as defined above for formula (III), preferably Q is selected from the group consisting of —O—, —NR—, —CR$_2$— and —S—; Y is either C or S; Z is selected from the group consisting of —OR, —NR$_2$, —CR$_3$, —SR, —SiR$_3$, —PR$_2$, —H, and substituted or unsubstituted aryl groups, with the proviso that when Q is —NR—then Z is selected from one of the group consisting of —OR, —NR$_2$, —SR, —SiR$_3$, —PR$_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

Illustrative but non-limiting examples of preferred bulky ligand metallocene catalysts include:

bis(cyclopentadienyl)titanium dimethyl,
bis(cyclopentadienyl)titanium diphenyl,
bis(cyclopentadienyl)zirconium dimethyl,
bis(cyclopentadienyl)zirconium diphenyl, bis(cyclopentadienyl)haffium methyl and diphenyl,
bis(cyclopentadienyl)titanium di-neopentyl,
bis(cyclopentadienyl)zirconium di-neopentyl,
bis(cyclopentadienyl)titanium dibenzyl,
bis(cyclopentadienyl)zirconium dibenzyl,
bis(cyclopentadienyl)vanadium dimethyl,
bis(cyclopentadienyl)titanium methyl chloride,
bis(cyclopentadienyl)titanium ethyl chloride,
bis(cyclopentadienyl)titanium phenyl chloride,
bis(cyclopentadienyl)zirconium methyl chloride,
bis(cyclopentadienyl)zirconium ethyl chloride,
bis(cyclopentadienyl)zirconium phenyl chloride,
bis(cyclopentadienyl)titanium methyl bromide,
cyclopentadienyl titanium trimethyl,
cyclopentadienyl zirconium triphenyl,
cyclopentadienyl zirconium trineopentyl,
cyclopentadienyl zirconium trimethyl,
cyclopentadienyl hafnium triphenyl,
cyclopentadienyl hafnium trineopentyl,
cyclopentadienyl hafnium trimethyl,
pentamethylcyclopentadienyl titanium trichloride,
pentaethylcyclopentadienyl titanium trichloride;
bis(indenyl)titanium diphenyl or dichloride,
bis(methylcyclopentadienyl)titanium diphenyl or dihalide,
bis(1,2-dimethylcyclopentadienyl)titanium diphenyl or dichloride,
bis(1,2-diethylcyclopentadienyl)titanium diphenyl or dichloride,
bis(pentamethylcyclopentadienyl)titanium diphenyl or dichloride;
dimethyl silyldicyclopentadienyl titanium diphenyl or dichloride,
methyl phosphine dicyclopentadienyl titanium diphenyl or dichloride,
methylenedicyclopentadienyl titanium diphenyl or dichloride,
isopropyl(cyclopentadienyl)(fluorenyl)zirconium dichloride,
isopropyl(cyclopentadienyl)(octahydrofluorenyl)zirconium dichloride,
dilsopropylmethylene(cyclopentadienyl)(fluorenyl) zirconium dichloride,
diisobutylmethylene(cyclopentadienyl)(fluorenyl)zirconium dichloride,
ditertbutylmethylene(cyclopentadienyl)(fluorenyl) zirconium dichloride,
cyclohexylidene(cyclopentadienyl)(fluorenyl)zirconium dichloride,
diisopropylmethylene(2,5-dimethylcyclopentadienyl)(fluorenyl)zirconium dichloride,
isopropyl(cyclopentadienyl)(fluorenyl)hafniium dichloride,
diphenylmethylene(cyclopentadienyl)(fluorenyl)hafnium dichloride,
diisopropylmethylene(cyclopentadienyl)(fluorenyl)hafnium dichloride,
diisobutylmethylene(cyclopentadienyl)(fluorenyl)hafnium dichloride,
ditertbutylmethylene(cyclopentadienyl)(fluorenyl)hafnium dichloride,
cyclohexylidene(cyclopentadienyl)(fluorenyl)hafnium dichloride,
diisopropylmethylene(2,5-dimethylcyclopentadienyl)(fluorenyl)-hafnium dichloride,
isopropyl(cyclopentadienyl)(fluorenyl)titanium dichloride,
diphenylmethylene(cyclopentadienyl)(fluorenyl)titanium dichloride,
diisopropylmethylene(cyclopentadienyl)(fluorenyl)titanium dichloride,
diisobutylmethylene(cyclopentadienyl)(fluorenyl)titanium dichloride,
ditertbutylmethylene(cyclopentadienyl)(fluorenyl)titanium dichloride,
cyclohexylidene(cyclopentadienyl)(fluorenyl)titanium dichloride,
diisopropylmethylene(2,5 dimethylcyclopentadienyl fluorenyl)titanium dichloride,
racemic-ethylene bis(1-indenyl)zirconium(W)dichloride,
racemic-ethylene bis(4,5,6,7-tetrahydro-1-indenyl) zirconium(IV)dichloride,
racemic-dimethylsilyl bis(1-indenyl)zirconium(IV) dichloride,
racemic-dimethylsilyl bis(4,5,6,7-tetrahydro-1-indenyl) zirconium(IV)dichloride,
racemic-1,1,2,2-tetramethylsilanylene bis(1-indenyl) zirconium(IV)dichloride,
racemic-1,1,2,2-tetramethylsilanylene bis(4,5,6,7-tetrahydro-1-indenyl)zirconium(IV)dichloride,
ethylidene (1-indenyl tetramethylcyclopentadienyl) zirconium(IV)dichloride,
racemic-dimethylsilyl bis(2-methyl-4-t-butyl-1-cyclopentadienyl)zirconium(IV)dichloride,
racemic-ethylene bis(1-indenyl)hafnimn(IV)dichloride,
racemic-ethylene bis(4,5,6,7-tetrahydro-1-indenyl) hafiium(IV)dichloride,
racemic-dimethylsilyl bis(1-indenyl)hafaium(IV)dichloride,
racemic-dimethylsilyl bis(4,5,6,7-tetrahydro-1-indenyl) hafnium(IV)dichloride,
racemic-1,1,2,2-tetramethylsilanylene bis(1-indenyl) hafnium(IV)dichloride,
racemic-1,1,2,2-tetramethylsilanylene bis(4,5,6,7-tetrahydro-1-indenyl)hafnium(IV), dichloride,
ethylidene(1-indenyl-2,3,4,5-tetramethyl-1-cyclopentadienyl)hafnium(IV)dichloride,
racemic-ethylene bis(1-indenyl)titanium(IV)dichloride,
racemic-ethylene bis(4,5,6,7-tetrahydro-1-indenyl) titanium(IV)dichloride,
racemic-dimethylsilyl bis(1-indenyl)titanium(IV)dichloride,
racemic-dimethylsilyl bis(4,5,6,7-tetrahydro-1-indenyl) titanium(IV)dichloride,
racemic-1,1,2,2-tetramethylsilanylene bis(1-indenyl) titanium(IV)dichloride
racemic-1,1,2,2-tetramethylsilanylene bis(4,5,6,7-tetrahydro-1-indenyl)titanium(IV)dichloride,
ethylidene(1-indenyl-2,3,4,5-tetramethyl-1-cyclopentadienyl)titanium(IV)dichloride.
indenyl zirconium tris(diethylcarbamate),
indenyl zirconium tris(pivalate),
indenyl zirconium tris(p-toluate),
indenyl zirconium tris(benzoate), (1-methylindenyl) zirconium tris(pivalate),
(2-methylindenyl)zirconium tris(diethylcarbamate),
(methylcyclopentadienyl)zirconium tris(pivalate),
cyclopentadienyl tris(pivalate), and
(pentamethylcyclopentadienyl)zirconium tris(benzoate).

Activators

The above described catalyst compounds are typically activated in various ways to yield catalyst systems having a vacant coordination site that will coordinate, insert, and polymerize olefin(s). For the purposes of this patent specification and appended claims, the term "activator" is defined to be any compound or component or method which can activate any of the catalyst compounds of the invention as described above. Generally speaking, activators, for example may include a Lewis acid or a non-coordinating ionic activator or ionizing activator or any other compound including Lewis bases, aluminum alkyls, conventional cocatalysts and combinations thereof. Generally speaking activators convert a neutral catalyst compound to a catalytically active cation. It is within the scope of this invention to use alumoxane or modified alumoxane as an activator, and/or to also use ionizing activators, neutral or ionic, such as tri (n-butyl) ammonium tetrakis (pentafluorophenyl) boron, a trisperfluorophenyl boron metalloid precursor or a trisperfluoronaphtyl boron metalloid precursor, polyhalogenated heteroborane anions (WO 98/43983), boric acid (U.S. Pat. No. 5,942,459) or combination thereof, that would ionize the neutral metallocene catalyst compound.

In one embodiment, an activation method using ionizing ionic compounds not containing an active proton but capable of producing both a catalyst cation and a non-coordinating anion are also contemplated, and are described in EP-A-0 426 637, EP-A-0 573 403 and U.S. Pat. No. 5,387,568, which are all herein incorporated by reference. An aluminum based ionizing activator is described in U.S. Pat. No. 5,602, 269 and boron and aluminum based ionizing activators are described in WO 99/06414, which are incorporated herein by reference, and are useful in this invention.

There are a variety of methods for preparing alumoxane and modified alumoxanes, non-limiting examples of which are described in U.S. Pat. Nos. 4,665,208, 4,952,540, 5,091, 352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publications WO 94/10180 and WO 99/15534, all of which are herein fully incorporated by reference. A preferred alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584). MMAO -4 and MMAO-12 available from Akzo Chemicals, Inc. may also be used.

Organoaluminum compounds as activators include trimethylaluminum, triethylaluminum, triisobutylaluminum, tri-n-hexylaluminum, tri-n-octylaluminum and the like.

Ionizing compounds may contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-A-0 426 637, EP-A-500 944, EP-A-0 277 003 and EP-A-0 277 004, and U.S. Pat. Nos. 5,153,157, 5,198,401, 5,066,741, 5,206,197, 5,241,025, 5,387,568, 5,384,299, 5,502,124 and 5,643,847, all of which are herein fully incorporated by reference.

Other activators include those described in PCT publication WO 98/07515 such as tris (2,2',2"-nonafluorobiphenyl) fluoroaluminate, which publication is fully incorporated herein by reference. Combinations of activators are also contemplated by the invention, for example, alumoxanes and ionizing activators in combinations, see for example, EP-B1 0 573 120, PCT publications WO 94/07928 and WO 95/14044 and U.S. Pat. Nos. 5,153,157 and 5,453,410 all of which are herein fully incorporated by reference. WO 98/09996 incorporated herein by reference describes activating metallocene catalyst compounds with perchlorates, periodates and iodates including their hydrates. WO 98/30602 and WO 98/30603 incorporated by reference describe the use of lithium (2,2'-bisphenyl-ditrimenthylsilicate). 4THF as an activator for a metallocene catalyst compound. WO 99/18135 incorporated herein by reference describes the use of organo-boron-aluminum activators. EP-B1-0 781 299 describes using a silylium salt in combination with a non-coordinating compatible anion. Also, methods of activation such as using radiation (see EP-B1-0 615 981 herein incorporated by reference), electro-chemical oxidation, and the like are also contemplated as activating methods for the purposes of rendering the neutral metallocene catalyst compound or precursor to a metallocene cation capable of polymerizing olefins. Other activators or methods for activating a metallocene catalyst compound are described in for example, U.S. Pat. Nos. 5,849,852, 5,859,653 and 5,869,723 and WO 98/32775, WO 99/42467 (dioctadecylmethyl-ammonium-bis(tris (pentafluorophenyl)borane)benzimidazolide), which are herein incorporated by reference.

Preferably the group 15 metal compound and/or the phenoxide catalysts described herein, are preferably combined with one or more activators to form olefin polymerization catalyst systems. Preferred activators include alkyl aluminum compounds (such as diethylaluminum chloride), alumoxanes, modified alumoxanes, non-coordinating anions, non-coordinating group 13 metal or metalliod anions, boranes, borates and the like. It is within the scope of this invention to use alumoxane or modified alumoxane as an activator, and/or to also use ionizing activators, neutral or ionic, such as tri (n-butyl) ammonium tetrakis (pentafluorophenyl) boron or a trisperfluorophenyl boron metalloid precursor which ionize the neutral metallocene compound. Other useful compounds include triphenyl boron, triethyl boron, tri-n-butyl ammonium tetraethylborate, triaryl borane and the like. Other useful compounds include aluminate salts as well.

Also, methods of activation such as using radiation and the like are also contemplated as activators for the purposes of this invention.

Preferred activators include:

trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium)tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl-(2,4,6-trimethylanilinium)tetrakis (pentafluorophenyl)borate,
trimethylammonium tetrakis-(2,3,4,6-tetrafluorophenylborate,
triethylammonium tetrakis-(2,3,4,6-tetrafluorophenyl) borate,
tripropylammonium tetrakis-(2,3,4,6-tetrafluorophenyl) borate,
tri(n-butyl)ammonium tetrakis-(2,3,4,6-tetrafluoro-phenyl) borate,
dimethyl(t-butyl)ammonium tetrakis-(2,3,4,6-tetrafluorophenyl)borate,
N,N-dimethylanilinium tetrakis-(2,3,4,6-tetrafluorophenyl) borate, N,N-diethylanilinium tetrakis-(2,3,4,6-tetrafluoro-phenyl) borate, and
N,N-dimethyl-(2,4,6-trimethylanilinium)tetrakis-(2,3,4,6-tetrafluorophenyl)borate;
di-(i-propyl)ammonium tetrakis(pentafluorophenyl)borate,
dicyclohexylammonium tetrakis(pentafluorophenyl)borate;
triphenylphosphonium tetrakis(pentafluorophenyl)borate,
tri(o-tolyl)phosphonium tetrakis(pentafluorophenyl)borate,
tri(2,6-dimethylphenyl)phosphonium tetrakis (pentafluorophenyl)borate,
alumoxane,
methyl alumoxane,
modified alumoxane,
and modified methyl alumoxane.

Conventional Type Transition Metal Catalysts

In another embodiment, conventional-type transition metal catalysts may be used in the practice of this invention. Conventional-type transition metal catalysts are those traditional Ziegler-Natta, vanadium and Phillips-type catalysts well known in the art. Such as, for example Ziegler-Natta catalysts as described in *Ziegler-Natta Catalysts and Polymerizations,* John Boor, Academic Press, New York, 1979. Examples of conventional-type transition metal catalysts are also discussed in U.S. Pat. Nos. 4,115,639, 4,077,904, 4,482,687, 4,564,605, 4,721,763, 4,879,359 and 4,960,741 all of which are herein fully incorporated by reference. The conventional-type transition metal catalyst compounds that may be used in the present invention include transition metal compounds from Groups 3 to 17, preferably 4 to 12, more preferably 4 to 6 of the Periodic Table of Elements.

Preferred conventional-type transition metal catalysts may be represented by the formula: $MR_x$, where M is a metal from Groups 3 to 17, preferably Group 4 to 6, more preferably Group 4, most preferably titanium; R is a halogen or a hydrocarbyloxy group; and x is the oxidation state of the metal M. Non-limiting examples of R include alkoxy, phenoxy, bromide, chloride and fluoride. Non-limiting examples of conventional-type transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3 \cdot 1/3AlCl_3$ and $Ti(OC_{12}H_{25})Cl_3$.

Conventional-type transition metal catalyst compounds based on magnesium/titanium electron-donor complexes that are useful in the invention are described in, for example, U.S. Pat. Nos. 4,302,565 and 4,302,566, which are herein fully incorporate by reference. The $MgTiCl_6$(ethyl acetate)$_4$ derivative is particularly preferred.

British Patent Application 2,105,355 and U.S. Pat. No. 5,317,036, herein incorporated by reference, describes various conventional-type vanadium catalyst compounds. Non-limiting examples of conventional-type vanadium catalyst compounds include vanadyl trihalide, alkoxy halides and alkoxides such as $VOCl_3$, $VOCl_2(OBu)$ where Bu=butyl and $VO(OC_2H_5)_3$; vanadium tetra-halide and vanadium alkoxy halides such as $VCl_4$ and $VCl_3(OBu)$; vanadium and vanadyl acetyl acetonates and chloroacetyl acetonates such as $V(AcAc)_3$ and $VOCl_2(AcAc)$ where (AcAc) is an acetyl acetonate. The preferred conventional-type vanadium catalyst compounds are $VOCl_3$, $VCl_4$ and $VOCl_2$—OR where R is a hydrocarbon radical, preferably a $C_1$ to $C_{10}$ aliphatic or aromatic hydrocarbon radical such as ethyl, phenyl, isopropyl, butyl, propyl, n-butyl, iso-butyl, tertiary-butyl, hexyl, cyclohexyl, naphthyl, etc., and vanadium acetyl acetonates.

Conventional-type chromium catalyst compounds, often referred to as Phillips-type catalysts, suitable for use in the present invention include $CrO_3$, chromocene, silyl chromate, chromyl chloride ($CrO_2Cl_2$), chromium-2-ethyl-hexanoate, chromium acetylacetonate ($Cr(AcAc)_3$), and the like. Non-limiting examples are disclosed in U.S. Pat. Nos. 3,709,853, 3,709,954, 3,231,550, 3,242,099 and 4,077,904, which are herein fully incorporated by reference.

Still other conventional-type transition metal catalyst compounds and catalyst systems suitable for use in the present invention are disclosed in U.S. Pat. Nos. 4,124,532, 4,302,565, 4,302,566, 4,376,062, 4,379,758, 5,066,737, 5,763,723, 5,849,655, 5,852,144, 5,854,164 and 5,869,585 and published EP-A2 0 416 815 A2 and EP-A1 0 420 436, which are all herein incorporated by reference.

Other catalysts may include cationic catalysts such as $AlCl_3$, and other cobalt, iron, nickel and palladium catalysts well known in the art. See for example U.S. Pat. Nos. 3,487,112, 4,472,559, 4,182,814 and 4,689,437 all of which are incorporated herein by reference.

Typically, these conventional-type transition metal catalyst compounds excluding some conventional-type chromium catalyst compounds are activated with one or more of the conventional-type cocatalysts described below.

Conventional-type Cocatalysts

Conventional-type cocatalyst compounds for the above conventional-type transition metal catalyst compounds may be represented by the formula $M^3M^4_vX^2_cR^3_{b-c}$, wherein $M^3$ is a metal from Group 1 to 3 and 12 to 13 of the Periodic Table of Elements; $M^4$ is a metal of Group 1 of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent hydrocarbon radical.

Non-limiting examples of conventional-type organometallic cocatalyst compounds useful with the conventional-type catalyst compounds described above include methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as tri-hexyl-aluminum, triethylaluminum, trimethylaluminum, and tri-isobutylaluminum. Other conventional-type cocatalyst compounds include mono-organohalides and hydrides of Group 2 metals, and mono- or di-organohalides and hydrides of Group 3 and 13 metals. Non-limiting examples of such conventional-type cocatalyst compounds include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octyhlagnesium hydride, butylzinc hydride, dichloroboron hydride, di-bromoaluminum hydride and bromocadmium hydride. Conventional-type organometallic cocatalyst compounds are known to those in the art and a more complete discussion of these compounds may be found in U.S. Pat. Nos. 3,221,002 and 5,093,415, which are herein fully incorporated by reference.

Supports

The above described metal catalyst compounds, activators and/or catalyst systems are typically combined with one or more support materials or carriers. For example, in a preferred embodiment, the activator is contacted with a support to form a supported activator wherein the activator is deposited on, contacted with, vaporized with, bonded to, or incorporated within, adsorbed or absorbed in, or on, a support or carrier and thereafter combined with a catalyst compound. In another preferred embodiment the metal catalyst compound is contacted with a support to form a supported catalyst compound wherein the catalyst compound is deposited on, contacted with, vaporized with, bonded to, or incorporated within, adsorbed or absorbed in, or on, a support or carrier and thereafter contacted with an activator. In another embodiment, the metal catalyst compound and the activator are combined and thereafter contacted with a support to form a supported catalyst system wherein the system is deposited on, contacted with, vaporized with, bonded to, or incorporated within, adsorbed or absorbed in, or on, a support or carrier.

There are various methods known in the art for producing a supported activator or combining an activator with a support material. In an embodiment, the support material is chemically treated and/or dehydrated prior to combining with the catalyst compound, activator and/or catalyst system.

In one embodiment, an alumoxane is contacted with a support material, preferably a porous support material, more preferably a inorganic oxide, and most preferably the support material is silica.

In an embodiment, the support material, having a various levels of dehydration, preferably 200° C. to 600° C. dehydrated silica, that is then contacted with an organoaluminum or alumoxane compound. In specifically the embodiment wherein an organoaluminum compound is used, the activator is formed in situ the support material as a result of the reaction of, for example, trimethylaluminum and water.

In yet another embodiment, a Lewis base-containing support substrates will react with a Lewis acidic activator to form a support bonded Lewis acid compound. The Lewis base hydroxyl groups of silica are exemplary of metal/metalloid oxides where this method of bonding to a support occurs. This embodiment is described in U.S. patent application Ser. No. 09/191,922, filed Nov. 13, 1998, which is herein incorporated by reference.

Other embodiments of supporting an activator are described in U.S. Pat. No. 5,427,991, where supported non-coordinating anions derived from trisperfluorophenyl boron are described; U.S. Pat. No. 5,643,847 discusses the reaction of Group 13 Lewis acid compounds with metal oxides such as silica and illustrates the reaction of trisperfluorophenyl boron with silanol groups (the hydroxyl groups of silicon) resulting in bound anions capable of protonating transition metal organometallic catalyst compounds to form catalytically active cations counter-balanced by the bound anions; immobilized Group IIIA Lewis acid catalysts suitable for carbocationic polymerizations are described in U.S. Pat. No. 5,288,677; and James C. W. Chien, Jour. Poly. Sci.: Pt A: Poly. Chem, Vol. 29, 1603–1607 (1991), describes the olefin polymerization utility of methylalumoxane (MAO) reacted with silica ($SiO_2$) and metallocenes and describes a covalent bonding of the aluminum atom to the silica through an oxygen atom in the surface hydroxyl groups of the silica.

In the preferred embodiment, the supported activator is formed by preparing in an agitated, and temperature and pressure controlled vessel a solution of the activator and a suitable solvent, then adding the support material at temperatures from 0° C. to 100° C., contacting the support with the activator solution for up to 24 hours, then using a combination of heat and pressure to remove the solvent to produce a free flowing powder. Temperatures can range from 40 to 120° C. and pressures from 5 psia to 20 psia (34.5 to 138 kPa). An inert gas sweep can also be used in assist in removing solvent. Alternate orders of addition, such as slurrying the support material in an appropriate solvent then adding the activator, can be used.

In an embodiment, the weight percent of the activator to the support material is in the range of from about 10 weight percent to about 70 weight percent, preferably in the range of from 20 weight percent to about 60 weight percent, more preferably in the range of from about 30 weight percent to about 50 weight percent, and most preferably in the range of from 30 weight percent to about 40 weight percent.

Prior to use the support is preferably partially or completely dehydrated. The dehydration may be done physically by calcining or by chemically converting all or part of the active hydroxyls. For more information on how to support catalysts please see U.S. Pat. No. 4,808,561 which discloses how to support a metallocene catalyst system. The techniques used therein are generally applicable for this invention.

The combination of the metal catalyst compound, the activator and the support may occur in any order. In one embodiment, once the activator is supported, it is then combined with a metal catalyst compound to form a supported catalyst system. Similarly, the metal catalyst compound may be placed upon the support first, preferably tethered there by a covalent linkage, and thereafter the activator added in to form the supported catalyst system. In another embodiment the metal catalyst compound and the activator are combined first then placed on the support.

In a preferred embodiment the support is a particulate filler. In one aspect the particulate filler may be any known particulate filler including carbon black, talc; inorganic oxides such as silica; magnesium chloride, alumina, silica-alumina; polymeric materials such as polyethylene, polypropylene, polystyrene, crossed-linked polystyrene; and the like. In a preferred embodiment herein the particulate filler is fumed silica. Filler such as Cabosil TS-610, available from Cabot Corporation, which is a fumed silica with particles 7 to 30 nanometers in size that has been treated with dimethylsilyldichloride such that a majority of hydroxyl groups are capped may be used.

Suitable support materials include inorganic or organic support materials, preferably a porous support material. Non-limiting examples of inorganic support materials include inorganic oxides and inorganic chlorides. Other carriers include resinous support materials such as polystyrene, functionalized or crosslinked organic supports, such as polystyrene divinyl benzene, polyolefins or polymeric compounds, or any other organic or inorganic support material and the like, or mixtures thereof.

Preferred support materials include inorganic oxides that include those Group 2, 3, 4, 5, 13 or 14 metal oxides. The preferred supports include silica, fumed silica, fumed alumina, alumina (WO 99/60033), silica-alumina and mixtures thereof. Other useful supports include magnesia, titania, zirconia, magnesium chloride (U.S. Pat. No. 5,965,477), montmorillonite (EP-B1 0 511 665), phyllosilicate, zeolites, talc, clays (U.S. Pat. No. 6,034,187) and the like. Also, combinations of these support materials may be used, for example, silica-chromium, silica-alumina, silica-titania and the like. Additional support materials may include those porous acrylic polymers described in EP 0 767 184 B1, which is incorporated herein by reference. Other support materials include nanocomposites as described in PCT WO 99/47598, aerogels as described in WO 99/48605, spherulites as described in U.S. Pat. No. 5,972,510 and polymeric beads as described in WO 99/50311, which are all herein incorporated by reference. A preferred support is fumed silica available under the trade name Cabosil™ TS-610, available from Cabot Corporation. Fumed silica is typically a silica with particles 7 to 30 nanometers in size that has been treated with dimethylsilyldichloride such that a majority of hydroxyl groups are capped.

It is preferred that the support material, most preferably an inorganic oxide, has a surface area in the range of from about 10 to about 700 m$^2$/g, pore volume in the range of from about 0.1 to about 4.0 cc/g and average particle size in the range of from about 5 to about 500 μm. More preferably, the surface area of the support is in the range of from about 50 to about 500 m$^2$/g, pore volume of from about 0.5 to about 3.5 cc/g and average particle size of from about 10 to about 200 μm. Most preferably the surface area of the support is in the range from about 100 to about 1000 m$^2$/g, pore volume from about 0.8 to about 5.0 cc/g and average particle size is from about 5 to about 100 μm. The average pore size of the support material of the invention typically has pore size in the range of from 10 to 1000 Å, preferably 50 to about 500 Å, and most preferably 75 to about 450 Å.

Spray-Drying

Once the two (or more) supported catalyst systems are prepared they are then combined, if they are not already in the same liquid diluent and spray dried. The catalyst systems are preferably suspended in a liquid, and then subjected to spray drying by forcing the suspension at high pressures through a nozzle. Preferably the spray dried materials form a free flowing powder.

Spray drying may be by any means known in the art. Please see EPA 0 668 295 B1, U.S. Pat. Nos. 5,674,795 and 5,672,669 which particularly describe spray drying of supported catalysts. The catalyst may be sprayed onto a surface or sprayed such that the droplets dry in midflight before the droplets contact a surface.

The method generally employed is to disperse the supported catalyst systems in a liquid, preferably a volatile liquid. Variations are also possible however. For example, two different supported activators and unsupported catalyst compound may be dispersed in solution, allowed to react and then spray dried. Similarly, two different supported catalyst compounds and unsupported activator may be dispersed in a liquid, allowed to react and then spray dried. Typical slurry concentrations before spray drying are about 5–8 wt %.

In one preferred embodiment, the makeup of the dried material is about 40–50 wt % activator, (preferably alumoxane), 50–60 SiO$_2$ and about ~2 wt % metal catalyst compound.

Another embodiment would be to covalently tether the catalyst compound to the organic or inorganic support and then add an activator.

In addition, another additive, such as 1-hexene in about 10 vol % can be present in the activator/filler mixture prior to the addition of the first metal catalyst compound.

In another embodiment binders are added to the mix. These can be added as a means of improving the particle morphology, i.e. narrowing the particle size distribution, lower porosity of the particles and allowing for a reduced quantity of alumoxane, which is acting as the 'binder'.

The spray dried particles are generally fed into the polymerization reactor as a mineral oil slurry. Solids concentrations in oil are about 10–15 weight %, preferably 11–14 weight %. In some embodiments, the spray dried particles are <~10 micrometers in size from the lab-scale Buchi spray-dryer, while the scaled up rotary atomizers can create particles ~25 micrometers, compared to conventional supported catalysts which are ~50 micrometers. In a preferred embodiment the particle has an average particle size of 0.001 to 1 microns, preferably 0.001 to 0.1 microns.

Polymerization Process of the Invention

The catalysts and catalyst systems described above are suitable for use in the polymerization process of the invention. The polymerization process of the invention includes a solution, gas or slurry process or a combination thereof, most preferably a gas or slurry phase process.

In an embodiment, this invention is directed toward the slurry or gas phase polymerization or copolymerization reactions involving the polymerization of one or more monomers having from 2 to 30 carbon atoms, preferably 2–12 carbon atoms, and more preferably 2 to 8 carbon atoms. The invention is particularly well suited to the copolymerization reactions involving the polymerization of one or more olefin monomers of ethylene, propylene, butene-1, pentene-1, 4-methyl-pentene-1, hexene-1, octene-1, decene-1, 3-methyl-pentene-1, 3,5,5-trimethyl-hexene-1 and cyclic olefins or a combination thereof. Other monomers can include vinyl monomers, diolefins such as dienes, polyenes, norbornene, norbornadiene monomers. Preferably a copolymer of ethylene is produced, where the comonomer is at least one alpha-olefin having from 4 to 15 carbon atoms, preferably from 4 to 12 carbon atoms, more preferably from 4 to 8 carbon atoms and most preferably from 4 to 7 carbon atoms. In an alternate embodiment, the geminally disubstituted olefins disclosed in WO 98/37109 may be polymerized or copolymerized using the invention herein described.

In another embodiment ethylene or propylene is polymerized with at least two different comonomers to form a terpolymer. The preferred comonomers are a combination of alpha-olefin monomers having 4 to 10 carbon atoms, more preferably 4 to 8 carbon atoms, optionally with at least one diene monomer. The preferred terpolymers include the combinations such as ethylene/butene-1/hexene-1, ethylene/propylene/butene-1, propylene/ethylene/hexene-1, ethylene/propylene/ norbornene and the like.

In a particularly preferred embodiment the process of the invention relates to the polymerization of ethylene and at least one comonomer having from 4 to 8 carbon atoms, preferably 4 to 7 carbon atoms. Particularly, the comonomers are butene-1, 4-methyl-pentene-1, hexene-1 and octene-1, the most preferred being hexene-1 and/or butene-1.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference.)

The reactor pressure in a gas phase process may vary from about 10 psig (69 kPa) to about 500 psig (3448 kPa), preferably in the range of from about 100 psig (690 kPa) to about 400 psig (2759 kPa), preferably in the range of from about 200 psig (1379 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C. to about 115° C., more preferably in the range of from about 7° C. to 110° C., and most preferably in the range of from about 7° C. to about 95° C.

The productivity of the catalyst or catalyst system is influenced by the main monomer partial pressure. The preferred mole percent of the main monomer, ethylene or propylene, preferably ethylene, is from about 25 to 90 mole percent and the monomer partial pressure is in the range of from about 75 psia (517 kPa) to about 300 psia (2069 kPa), which are typical conditions in a gas phase polymerization process.

In a preferred embodiment, the reactor utilized in the present invention and the process of the invention produce greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

Other gas phase processes contemplated by the process of the invention include those described in U.S. Pat. Nos. 5,627,242, 5,665,818 and 5,677,375, and European publications EP-A-0 794 200, EP-A-0 802 202 and EP-B-634 421 all of which are herein fully incorporated by reference.

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

In one embodiment, a preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. The preferred temperature in the particle form process is within the range of about 185° F. (85° C.) to about 230° F. (110° C.). Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst as a slurry in isobutane or as a dry free flowing powder is injected regularly to the reactor loop, which is itself filled with circulating slurry of growing polymer particles in a diluent of isobutane containing monomer and comonomer. Hydrogen, optionally, may be added as a molecular weight control. The reactor is maintained at pressure of about 525 psig to 625 psig (3620 kPa to 4309 kPa) and at a temperature in the range of about 140° F. to about 220° F. (about 60° C. to about 104° C.) depending on the desired polymer density. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

In another embodiment in the slurry process of the invention the total reactor pressure is in the range of from 400 psig (2758 kPa) to 800 psig (5516 kPa), preferably 450 psig (3103 kPa) to about 700 psig (4827 kPa), more preferably 500 psig (3448 kPa) to about 650 psig (4482 kPa), most preferably from about 525 psig (3620 kPa) to 625 psig (4309 kPa).

In yet another embodiment in the slurry process of the invention the concentration of ethylene in the reactor liquid medium is in the range of from about 1 to 10 weight percent, preferably from about 2 to about 7 weight percent, more preferably from about 2.5 to about 6 weight percent, most preferably from about 3 to about 6 weight percent.

A preferred process of the invention is where the process, preferably a slurry or gas phase process is operated in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. No. 5,712,352, which are herein fully incorporated by reference.

In another preferred embodiment the one or all of the catalysts are combined with up to 10 weight % of a metal stearate, (preferably a aluminum stearate, more preferably aluminum distearate) based upon the weight of the catalyst, any support and the stearate, preferably 2 to 3 weight %.

In a preferred embodiment, the polyolefin recovered typically has a melt index as measured by ASTM D-1238, Condition E, at 190° C. of 3000 g/10 min or less. In a preferred embodiment the polyolefin is ethylene homopolymer or copolymer. IN a preferred embodiment for certain applications, such as films, molded article and the like a melt index of 100 g/10 min or less is preferred. For some films and molded article a melt index of 10 g/10 min is preferred.

In a preferred embodiment the polymer produced has a molecular weight of 200,000 Daltons or more.

In a preferred embodiment the catalyst system described above is used to make a polyethylene having a density of between 0.88 and 0.970 g/cm³ (as measured by ASTM 2839), a melt index of 1.0 or less g/10 min or less (as measured by ASTM D-1238, Condition E, at 190° C.). Polyethylene having a melt index of between 0.01 to 10 dg/min is preferably produced. In some embodiments, a density of 0.915 to 0.940 g/cm³ would be preferred, in other embodiments densities of 0.930 to 0.960 g/cm³ are preferred.

The polyolefins then can be made into films, molded articles, sheets, wire and cable coating and the like. The films may be formed by any of the conventional technique known in the art including extrusion, co-extrusion, lamination, blowing and casting. The film may be obtained by the flat film or tubular process which may be followed by orientation in an uniaxial direction or in two mutually perpendicular directions in the plane of the film to the same or different extents. Orientation may be to the same extent in both directions or may be to different extents. Particularly preferred methods to form the polymers into films include extrusion or coextrusion on a blown or cast film line.

The films produced may further contain additives such as slip, antiblock, antioxidants, pigments, fillers, antifog, UV stabilizers, antistats, polymer processing aids, neutralizers, lubricants, surfactants, pigments, dyes and nucleating agents. Preferred additives include silicon dioxide, synthetic silica, titanium dioxide, polydimethylsiloxane, calcium carbonate, metal stearates, calcium stearate, zinc stearate, talc, $BaSO_4$, diatomaceous earth, wax, carbon black, flame retarding additives, low molecular weight resins, hydrocarbon resins, glass beads and the like. The additives may be present in the typically effective amounts well known in the art, such as 0.001 weight % to 10 weight %.

EXAMPLE 1

Silica (100 g) (Sylopol 2100 with a 5–7 micron average particle size) is calcined at 600° C., slurried with methylaluminoxane in toluene to give a loading of 4.5 mmol Al/g and evaporated to a free-flowing powder. To 20 g of this material is added 400 mg bis(cyclopentadienyl)zirconium dichloride and 50 g hexane and the mixture is rolled 24 hours. This is catalyst A. Catalyst B was made similarly except that dimethylsilylbis(tetrahydroindenyl)zirconium dichloride is used instead of bis(cyclopentadienyl)zirconium dichloride. Catalyst A (10 g) and catalyst B (2 g) are dry blended, slurried in hexane and spray-dried with 20% TS-610 filler and methylalumoxane (5 wt % vs. supported catalysts, as a 4.5M toluene solution) to form Catalyst C.

Catalyst C is used in a gas phase reactor to polymerize ethylene.
Catalyst C is used in a slurry phase reactor to polymerize ethylene.
Catalyst C is used in a gas phase reactor to copolymerize ethylene and hexene.
Catalyst C is used in a slurry phase reactor to copolymerize ethylene and butene.

All documents described herein are incorporated by reference herein, including any priority documents and/or testing procedures. As is apparent form the foregoing general description and the specific embodiments, while forms of the invention have been illustrated and described, various modifications can be made without departing from the spirit and scope of the invention. Accordingly it is not intended that the invention be limited thereby.

We claim:

1. A method of preparing a supported catalyst system comprising combining 1) a first supported catalyst system comprising a support, an activator and a metal catalyst compound, and 2) a second supported catalyst system comprising a support, an activator and a metal catalyst compound; and thereafter spray-drying the combination of 1) and 2); and wherein the particle size of the first supported catalyst system is different from the particle size of the second supported catalyst system.

2. The method of claim 1 wherein the first catalyst compound is different from the second catalyst compound.

3. The method of claim 1 wherein the activator of the first supported catalyst system is different from the activator of the second supported catalyst system.

4. The method of claim 1 wherein the combination to be spray dried is prepared by combining a two different supported activators with a catalyst compound.

5. The method of claim 1 wherein the combination to be spray dried is prepared by combining a two or more different supported catalyst compounds with an activator.

6. The method of claim 1 wherein at least one of the activators is selected from the group consisting of alumoxanes, modified alumoxanes, non-coordinating ionic activators and ionizing activators.

7. The method of claim 1 wherein at least one of the activators is selected from the group consisting of:

trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium)tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl-(2,4,6-trimethylanilinium)tetrakis(pentafluorophenyl)borate,
trimethylammonium tetrakis-(2,3,4,6-tetrafluorophenylborate,
triethylammonium tetrakis-(2,3,4,6-tetrafluorophenyl)borate,
tripropylammonium tetrakis-(2,3,4,6-tetrafluorophenyl)borate,
tri(n-butyl)ammonium tetrakis-(2,3,4,6-tetrafluoro-phenyl)borate,
dimethyl(t-butyl)ammonium tetrakis-(2,3,4,6-tetrafluorophenyl)borate,
N,N-dimethylanilinium tetrakis-(2,3,4,6-tetrafluorophenyl)borate,
N,N-diethylanilinium tetrakis-(2,3,4,6-tetrafluoro-phenyl)borate, and
N,N-dimethyl-(2,4,6-trimethylanilinium)tetrakis-(2,3,4,6-tetrafluorophenyl)borate;
di-(i-propyl)ammonium tetrakis(pentafluorophenyl)borate,
dicyclohexylammonium tetrakis(pentafluorophenyl)borate;
triphenylphosphonium tetrakis(pentafluorophenyl)borate,
tri(o-tolyl)phosphonium tetrakis(pentafluorophenyl)borate, tri(2,6-dimethylphenyl)phosphonium tetrakis (pentafluorophenyl)borate, methyl alumoxane, and modified methyl alumoxane.

8. The method of claim 1 wherein at least one of the two or more different catalyst compounds comprises a bulky ligand metallocene compound.

9. The method of claim 1 wherein one or more of the catalyst compounds is selected from the group consisting of:

bis(cyclopentadienyl)titanium dimethyl,
bis(cyclopentadienyl)titanium diphenyl,
bis(cyclopentadienyl)zirconium dimethyl,
bis(cyclopentadienyl)zirconium diphenyl,
bis(cyclopentadienyl)hafnium methyl and diphenyl,
bis(cyclopentadienyl)titanium di-neopentyl,
bis(cyclopentadienyl)zirconium di-neopentyl,
bis(cyclopentadienyl)titanium dibenzyl,
bis(cyclopentadienyl)zirconium dibenzyl,
bis(cyclopentadienyl)vanadium dimethyl,
bis(cyclopentadienyl)titanium methyl chloride,
bis(cyclopentadienyl)titanium ethyl chloride,
bis(cyclopentadienyl)titanium phenyl chloride,
bis(cyclopentadienyl)zirconium methyl chloride,
bis(cyclopentadienyl)zirconium ethyl chloride,
bis(cyclopentadienyl)zirconium phenyl chloride,
bis(cyclopentadienyl)titanium methyl bromide,
cyclopentadienyl titanium trimethyl,
cyclopentadienyl zirconium triphenyl,
cyclopentadienyl zirconium trineopentyl,
cyclopentadienyl zirconium trimethyl,
cyclopentadienyl hafnium triphenyl,
cyclopentadienyl hafnium trineopentyl,
cyclopentadienyl hafnium trimethyl,
pentamethylcyclopentadienyl titanium trichloride,
pentaethylcyclopentadienyl titanium trichloride;
bis(indenyl)titanium diphenyl or dichloride,
bis(methylcyclopentadienyl)titanium diphenyl or dihalide,
bis(1,2-dimethylcyclopentadienyl)titanium diphenyl or dichloride,
bis(1,2-diethylcyclopentadienyl)titanium diphenyl or dichloride,
bis(pentamethylcyclopentadienyl)titanium diphenyl or dichloride;
dimethyl silyldicyclopentadienyl titanium diphenyl or dichloride,
methyl phosphine dicyclopentadienyl titanium diphenyl or dichloride,
methylenedicyclopentadienyl titanium diphenyl or dichloride,
isopropyl(cyclopentadienyl)(fluorenyl)zirconium dichloride,
isopropyl(cyclopentadienyl)(octahydrofluorenyl)zirconium dichloride,
diisopropylmethylene(cyclopentadienyl)(fluorenyl) zirconium dichloride,
diisobutylmethylene(cyclopentadienyl)(fluorenyl)zirconium dichloride,
ditertbutylmethylene(cyclopentadienyl)(fluorenyl) zirconium dichloride,
cyclohexylidene(cyclopentadienyl)(fluorenyl)zirconium dichloride,
diisopropylmethylene(2,5-dimethylcyclopentadienyl) (fluorenyl)zirconium dichloride,
isopropyl(cyclopentadienyl)(fluorenyl)hafnium dichloride,
diphenylmethylene(cyclopentadienyl)(fluorenyl)hafnium dichloride,
diisopropylmethylene(cyclopentadienyl)(fluorenyl)hafnium dichloride,
diisobutylmethylene(cyclopentadienyl)(fluorenyl)hafnium dichloride,
ditertbutylmethylene(cyclopentadienyl)(fluorenyl)hafnium dichloride,
cyclohexylidene(cyclopentadienyl)(fluorenyl)hafnium dichloride,
diisopropylmethylene(2,5-dimethylcyclopentadienyl) (fluorenyl)-hafnium dichloride,
isopropyl(cyclopentadienyl)(fluorenyl)titanium dichloride,
diphenylmethylene(cyclopentadienyl)(fluorenyl)titanium dichloride,
diisopropylmethylene(cyclopentadienyl)(fluorenyl)titanium dichloride,
diisobutylmethylene(cyclopentadienyl)(fluorenyl)titanium dichloride,
ditertbutylmethylene(cyclopentadienyl)(fluorenyl)titanium dichloride,
cyclohexylidene(cyclopentadienyl)(fluorenyl)titanium dichloride,
diisopropylmethylene(2,5 dimethylcyclopentadienyl fluorenyl)titanium dichloride,
racemic-ethylene bis(1-indenyl)zirconium(W)dichloride,
racemic-ethylene bis(4,5,6,7-tetrahydro-1-indenyl) zirconium(IV)dichloride,
racemic-dimethylsilyl bis(1-indenyl)zirconium(IV) dichloride,
racemic-dimethylsilyl bis(4,5,6,7-tetrahydro-1-indenyl) zirconium(IV)dichloride,
racemic-1,1,2,2-tetramethylsilanylene bis(1-indenyl) zirconium(IV)dichloride,
racemic-1,1,2,2-tetramethylsilanylene bis(4,5,6,7-tetrahydro-1-indenyl)zirconium(IV)dichloride,
ethylidene(1-indenyl tetramethylcyclopentadienyl) zirconium(IV)dichloride,
racemic-dimethylsilyl bis(2-methyl-4-t-butyl-1-cyclopentadienyl)zirconium(IV)dichloride,
racemic-ethylene bis(1-indenyl)hafnium(IV)dichloride,
racemic-ethylene bis(4,5,6,7-tetrahydro-1-indenyl) hafnium(IV)dichloride,
racemic-dimethylsilyl bis(1-indenyl)hafnium(IV)dichloride,
racemic-dimethylsilyl bis(4,5,6,7-tetrahydro-1-indenyl) hafnium(IV)dichloride,
racemic-1,1,2,2-tetramethylsilanylene bis(1-indenyl) hafnium(IV)dichloride,
racemic-1,1,2,2-tetramethylsilanylene bis(4,5,6,7-tetrahydro-1-indenyl)hafnium(IV)dichloride,
ethylidene(1-indenyl-2,3,4,5-tetramethyl-1-cyclopentadienyl)hafnium(IV)dichloride,
racemic-ethylene bis(1-indenyl)titanium(IV)dichloride,
racemic-ethylene bis(4,5,6,7-tetrahydro-1-indenyl) titanium(IV)dichloride,
racemic-dimethylsilyl bis(1-indenyl)titanium(IV)dichloride,
racemic-dimethylsilyl bis(4,5,6,7-tetrahydro-1-indenyl) titanium(IV)dichloride,
racemic-1,1,2,2-tetramethylsilanylene bis(1-indenyl) titanium(IV)dichloride
racemic-1,1,2,2-tetramethylsilanylene bis(4,5,6,7-tetrahydro-1-indenyl)titanium(IV)dichloride,
ethylidene(1-indenyl-2,3,4,5-tetramethyl-1-cyclopentadienyl)titanium(IV)dichloride,
indenyl zirconium tris(diethylcarbamate),
indenyl zirconium tris(pivalate),
indenyl zirconium tris(p-toluate),
indenyl zirconium tris(benzoate), (1-methylindenyl) zirconium tris(pivalate),
(2-methylindenyl)zirconium tris(diethylcarbamate),
(methylcyclopentadienyl)zirconium tris(pivalate), cyclopentadienyl tris(pivalate),
(pentamethylcyclopentadienyl)zirconium tris(benzoate),
bis(pentamethylcyclopentadienyl)zirconium dichloride,
bis(pentamethylcyclopentadienyl)zirconium dimethyl,
(indenyl)(pentamethylcyclopentadienyl)zirconium dichloride, and
(indenyl)(pentamethylcyclopentadienyl)zirconium dimethyl.

10. The method of claim 1 wherein at least one of the two or more different catalyst compounds comprises a catalyst compound selected from the group consisting of:

bis(N-methyl-3,5-di-t-butylsalicylimino)zirconium(IV) dibenzyl;
bis(N-ethyl-3,5-di-t-butylsalicylimino)zirconium(IV) dibenzyl;
bis(N-iso-propyl-3,5-di-t-butylsalicylimino)zirconium(IV) dibenzyl;
bis(N-t-butyl-3,5-di-t-butylsalicylimino)zirconium(IV) dibenzyl;
bis(N-benzyl-3,5-di-t-butylsalicylimino)zirconium(IV) dibenzyl;
bis(N-hexyl-3,5-di-t-butylsalicylimino)zirconium(IV) dibenzyl;
bis(N-phenyl-3,5-di-t-butylsalicylimino)zirconium(IV) dibenzyl;
bis(N-methyl-3,5-di-t-butylsalicylimino)zirconium(IV) dibenzyl;
bis(N-benzyl-3,5-di-t-butylsalicylimino)zirconium(IV) dichloride;
bis(N-benzyl-3,5-di-t-butylsalicylimino)zirconium(IV) dipivalate;
bis(N-benzyl-3,5-di-t-butylsalicylimino)titanium(IV) dipivalate;
bis(N-benzyl-3,5-di-t-butylsalicylimino)zirconium(IV)di(bis(dimethylamide));
bis(N-iso-propyl-3,5-di-t-amylsalicylimino)zirconium(IV) dibenzyl;
bis(N-iso-propyl-3,5-di-t-octylsalicylimino)zirconium(IV) dibenzyl;
bis(N-iso-propyl-3,5-di-(1',1'-dimethylbenzyl)salicylimino)zirconium(IV)dibenzyl;
bis(N-iso-propyl-3,5-di-(1',1'-dimethylbenzyl)salicylimino)titanium(IV)dibenzyl;
bis(N-iso-propyl-3,5-di-(1',1'-dimethylbenzyl)salicylimino)hafnium(IV)dibenzyl;
bis(N-iso-butyl-3,5-di-(1',1'-dimethylbenzyl)salicylimino)zirconium(IV)dibenzyl;
bis(N-iso-butyl-3,5-di-(1',1'-dimethylbenzyl)salicylimino)zirconium(IV)dichloride;
bis(N-hexyl-3,5-di-(1',1'-dimethylbenzyl)salicylimino)zirconium(IV)dibenzyl;
bis(N-phenyl-3,5-di-(1',1'-dimethylbenzyl)salicylimino)zirconium(IV)dibenzyl;
bis(N-iso-propyl-3,5-di-(1'-methylcyclohexyl)salicylimino)zirconium(IV)dibenzyl;
bis(N-benzyl-3-t-butylsalicylimino)zirconium(IV)dibenzyl;
bis(N-benzyl-3-triphenylmethylsalicylimino)zirconium(IV) dibenzyl;
bis(N-iso-propyl-3,5-di-trimethylsilylsalicylimino)zirconium(IV)dibenzyl;
bis(N-iso-propyl-3-(phenyl)salicylimino)zirconium(IV) dibenzyl;
bis(N-benzyl-3-(2',6'-di-iso-propylphenyl)salicylimino)zirconium(IV)dibenzyl;
bis(N-benzyl-3-(2',6'-di-phenylphenyl)salicylimino)zirconium(IV)dibenzyl;
bis(N-benzyl-3-t-butyl-5-methoxysalicylimino)zirconium(IV)dibenzyl;
bis(2-(2H-benzotriazol-2-yl)-4,6-di-t-amylphenoxide)zirconium(IV)dibenzyl;
bis(2-(2H-benzotriazol-2-yl)-4,6-di-t-amylphenoxide)zirconium(IV)dichloride;
bis(2-(2H-benzotriazol-2-yl)-4,6-di-t-amylphenoxide)zirconium(IV) di(bis(dimethylamide));
bis(2-(2H-benzotriazol-2-yl)-4,6-di-(1',1'-dimethylbenzyl)phenoxide)zirconium(IV)dibenzyl;
bis(2-(2H-benzotriazol-2-yl)-4,6-di-t-amylphenoxide)titanium(IV)dibenzyl;
bis(2-(2H-benzotriazol-2-yl)-4,6-di-(1',1'-dimethylbenzyl)phenoxide)titanium(IV)dibenzyl;
bis(2-(2H-benzotriazol-2-yl)-4,6-di-(1',1'-dimethylbenzyl)phenoxide)titanium(IV)dichloride;
bis(2-(2H-benzotriazol-2-yl)-4,6-di-(1',1'-dimethylbenzyl)phenoxide)hafnium(IV)dibenzyl;
(N-phenyl-3,5-di-(1',1'-dimethylbenzyl)salicylimino)zirconium(IV)tribenzyl;
(N-(2',6'-di-iso-propylphenyl)-3,5-di-(1',1'-dimenthylbenzyl)salicylimino)zirconium(IV)tribenzyl;
(N-(2',6'-di-iso-propylphenyl)-3,5-di-(1',1'-dimenthylbenzyl)salicylimino)titanium(IV)tribenzyl; and
(N-(2',6'-di-iso-propylphenyl)-3,5-di-(1',1'-dimenthylbenzyl)salicylimino)zirconium(IV) trichloride.

11. The method of claim 1 wherein at least one of the two or more different catalyst compounds comprises a catalyst compound represented by the formula:
[(2,4,6-$(CH_3)_3C_6H_2$)$NCH_2CH_2$]$_2$NH}$MBz_2$(where M is Hf, Zr, Ti, and Bz is a halide or a benzyl group).

12. A composition of matter comprising a particle comprising a first supported catalyst system comprising a support, an activator and a metal catalyst compound and second supported catalyst system comprising a support, an activator and a metal catalyst compound; wherein the particle size of the first supported catalyst system is different from the particle size of the second supported catalyst system.

13. The composition of claim 12 wherein the first catalyst compound is different from the second catalyst compound.

14. The composition of claim 12 wherein the activator of the first supported catalyst system is different from the activator of the second supported catalyst system.

15. The composition of claim 12 wherein at least one of the activators is selected from the group consisting of alumoxanes, modified alumoxanes, non-coordinating ionic activators and ionizing activators.

16. The composition of claim 12 wherein at least one of the activators is selected from the group consisting of:

trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium)tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl-(2,4,6-trimethylanilinium)tetrakis(pentafluorophenyl)borate, trimethylammonium tetrakis-(2,3,4,6-tetrafluorophenyl)borate,
triethylammonium tetrakis-(2,3,4,6-tetrafluorophenyl)borate,
tripropylammonium tetrakis-(2,3,4,6-tetrafluorophenyl)borate,
tri(n-butyl)ammonium tetrakis-(2,3,4,6-tetrafluoro-phenyl)borate,
dimethyl(t-butyl)ammonium tetrakis-(2,3,4,6-tetrafluorophenyl)borate,
N,N-dimethylanilinium tetrakis-(2,3,4,6-tetrafluorophenyl)borate,
N,N-diethylanilinium tetrakis-(2,3,4,6-tetrafluoro-phenyl)borate, and
N,N-dimethyl-(2,4,6-trimethylanilinium)tetrakis-(2,3,4,6-tetrafluorophenyl)borate;
di-(i-propyl)ammonium tetrakis(pentafluorophenyl)borate,
dicyclohexylammonium tetrakis(pentafluorophenyl)borate;
triphenylphosphonium tetrakis(pentafluorophenyl)borate,
tri(o-tolyl)phosphonium tetrakis(pentafluorophenyl)borate,
tri(2,6-dimethylphenyl)phosphonium tetrakis(pentafluorophenyl)borate,
methyl alumoxane,
and modified methyl alumoxane.

17. The composition of claim 12 wherein at least one of the two or more different catalyst compounds comprises a bulky ligand metallocene compound.

18. The composition of claim 12 wherein one or more of the catalyst compounds is selected from the group consisting of:
bis(cyclopentadienyl)titanium dimethyl,
bis(cyclopentadienyl)titanium diphenyl,
bis(cyclopentadienyl)zirconium dimethyl,
bis(cyclopentadienyl)zirconium diphenyl,
bis(cyclopentadienyl)hafnium methyl and diphenyl,
bis(cyclopentadienyl)titanium di-neopentyl,
bis(cyclopentadienyl)zirconium di-neopentyl,
bis(cyclopentadienyl)titanium dibenzyl,
bis(cyclopentadienyl)zirconium dibenzyl,
bis(cyclopentadienyl)vanadium dimethyl,
bis(cyclopentadienyl)titanium methyl chloride,
bis(cyclopentadienyl)titanium ethyl chloride,
bis(cyclopentadienyl)titanium phenyl chloride,
bis(cyclopentadienyl)zirconium methyl chloride,
bis(cyclopentadienyl)zirconium ethyl chloride,
bis(cyclopentadienyl)zirconium phenyl chloride,
bis(cyclopentadienyl)titanium methyl bromide,
cyclopentadienyl titanium trimethyl,
cyclopentadienyl zirconium triphenyl,
cyclopentadienyl zirconium trineopentyl,
cyclopentadienyl zirconium trimethyl,
cyclopentadienyl hafnium triphenyl,
cyclopentadienyl hafnium trineopentyl,
cyclopentadienyl hafnium trimethyl,
pentamethylcyclopentadienyl titanium trichloride,
pentaethylcyclopentadienyl titanium trichloride;
bis(indenyl)titanium diphenyl or dichloride,
bis(methylcyclopentadienyl)titanium diphenyl or dihalide,
bis(1,2-dimethylcyclopentadienyl)titanium diphenyl or dichloride,
bis(1,2-diethylcyclopentadienyl)titanium diphenyl or dichloride,
bis(pentamethylcyclopentadienyl)titanium diphenyl or dichloride;
dimethyl silyldicyclopentadienyl titanium diphenyl or dichloride,
methyl phosphine dicyclopentadienyl titanium diphenyl or dichloride,
methylenedicyclopentadienyl titanium diphenyl or dichloride,
isopropyl(cyclopentadienyl)(fluorenyl)zirconium dichloride,
isopropyl(cyclopentadienyl)(octahydrofluorenyl)zirconium dichloride,
diisopropylmethylene(cyclopentadienyl)(fluorenyl)zircomum dichloride,
diisobutylmethylene(cyclopentadienyl)(fluorenyl)zirconium dichloride,
ditertbutylmethylene(cyclopentadienyl)(fluorenyl)zirconium dichloride,
cyclohexylidene(cyclopentadienyl)(fluorenyl)zirconium dichloride,
diisopropylmethylene(2,5-dimethylcyclopentadienyl)(fluorenyl)zirconium dichloride,
isopropyl(cyclopentadienyl)(fluorenyl)hafnium dichloride,
diphenylmethylene(cyclopentadienyl)(fluorenyl)hafnium dichloride,
diisopropylmethylene(cyclopentadienyl)(fluorenyl)hafnium dichloride,
diisobutylmethylene(cyclopentadienyl)(fluorenyl)hafnium dichloride,
ditertbutylmethylene(cyclopentadienyl)(fluorenyl)hafnium dichloride,
cyclohexylidene(cyclopentadienyl)(fluorenyl)hafnium dichloride,
diisopropylmethylene(2,5-dimethylcyclopentadienyl)(fluorenyl)-hafnium dichloride,
isopropyl(cyclopentadienyl)(fluorenyl)titanium dichloride,
diphenylmethylene(cyclopentadienyl)(fluorenyl)titanium dichloride,
diisopropylmethylene(cyclopentadienyl)(fluorenyl)titanium dichloride,
diisobutylmethylene(cyclopentadienyl)(fluorenyl)titanium dichloride,
ditertbutylmethylene(cyclopentadienyl)(fluorenyl)titanium dichloride,
cyclohexylidene(cyclopentadienyl)(fluorenyl)titanium dichloride,
diisopropylmethylene(2,5 dimethylcyclopentadienyl fluorenyl)titanium dichloride,
racemic-ethylene bis(1-indenyl)zirconium(W)dichloride,
racemic-ethylene bis(4,5,6,7-tetrahydro-1-indenyl)zirconium(IV)dichloride,
racemic-dimethylsilyl bis(1-indenyl)zirconium(IV)dichloride,
racemic-dimethylsilyl bis(4,5,6,7-tetrahydro-1-indenyl)zirconium(IV)dichloride,
racemic-1,1,2,2-tetramethylsilanylene bis(1-indenyl)zirconium(IV)dichloride.
racemic-1,1,2,2-tetramethylsilanylene bis(4,5,6,7-tetrahydro-1-indenyl)zirconium(IV)dichloride,
ethylidene(1-indenyl tetramethylcyclopentadienyl) zirconium(IV)dichloride,
racemic-dimethylsilyl bis(2-methyl-4-t-butyl-1-cyclopentadienyl)zirconium(IV)dichloride,
racemic-ethylene bis(1-indenyl)hafnium(IV)dichloride,
racemic-ethylene bis(4,5,6,7-tetrahydro-1-indenyl) hafnium(IV)dichloride,
racemic-dimethylsilyl bis(1-indenyl)hafnium(IV)dichloride,
racemic-dimethylsilyl bis(4,5,6,7-tetrahydro-1-indenyl) hafnium(IV)dichloride,
racemic-1,1,2,2-tetramethylsilanylene bis(1-indenyl) hafnium(IV)dichloride,
racemic-1,1,2,2-tetramethylsilanylene bis(4,5,6,7-tetrahydro-1-indenyl)hafnium(IV)dichloride, ethylidene(1-indenyl-2,3,4,5-tetramethyl-1-cyclopentadienyl)hafnium(IV)dichloride,
racemic-ethylene bis(1-indenyl)titanium(IV)dichloride, racemic-ethylene bis(4,5,6,7-tetrahydro-1-indenyl)titanium(IV)dichloride,
racemic-dimethylsilyl bis(1-indenyl)titanium(IV)dichloride,
racemic-dimethylsilyl bis(4,5,6,7-tetrahydro-1-indenyl)titanium(IV)dichloride,
racemic-1,1,2,2-tetramethylsilanylene bis(1-indenyl)titanium(IV)dichloride
racemic-1,1,2,2-tetramethylsilanylene bis(4,5,6,7-tetrahydro-1-indenyl)titanium(IV)dichloride,
ethylidene(1-indenyl-2,3,4,5-tetramethyl-1-cyclopentadienyl)titanium(IV)dichloride,
indenyl zirconium tris(diethylcarbamate),
indenyl zirconium tris(pivalate),
indenyl zirconium tris(p-toluate),
indenyl zirconium tris(benzoate),(1-methylindenyl)zirconium tris(pivalate),
(2-methylindenyl)zirconium tris(diethylcarbamate),
(methylcyclopentadienyl)zirconium tris(pivalate),
cyclopentadienyl tris(pivalate),
(pentamethylcyclopentadienyl)zirconium tris(benzoate),
bis(pentamethylcyclopentadienyl)zirconium dichloride,
bis(pentamethylcyclopentadienyl)zirconium dimethyl,
(indenyl)(pentamethylcyclopentadienyl)zirconium dichloride, and
(indenyl)(pentamethylcyclopentadienyl)zirconium dimethyl.

19. The composition of claim 12 wherein at least one of the two or more different catalyst compounds comprises a catalyst compound selected from the group consisting of:
bis(N-methyl-3,5-di-t-butylsalicylimino)zirconium(IV)dibenzyl;
bis(N-ethyl-3,5-di-t-butylsalicylimino)zirconium(IV)dibenzyl;
bis(N-iso-propyl-3,5-di-t-butylsalicylimino)zirconium(IV)dibenzyl;
bis(N-t-butyl-3,5-di-t-butylsalicylimino)zirconium(IV)dibenzyl;
bis(N-benzyl-3,5-di-t-butylsalicylimino)zirconium(IV)dibenzyl;
bis(N-hexyl-3,5-di-t-butylsalicylimino)zirconium(IV)dibenzyl;
bis(N-phenyl-3,5-di-t-butylsalicylimino)zirconium(IV)dibenzyl;
bis(N-methyl-3,5-di-t-butylsalicylimino)zirconium(IV)dibenzyl;
bis(N-benzyl-3,5-di-t-butylsalicylimino)zirconium(IV)dichloride;
bis(N-benzyl-3,5-di-t-butylsalicylimino)zirconium(IV)dipivalate;
bis(N-benzyl-3,5-di-t-butylsalicylimino)titanium(IV)dipivalate;
bis(N-benzyl-3,5-di-t-butylsalicylimino)zirconium(IV)di(bis(dimethylamide));
bis(N-iso-propyl-3,5-di-t-amylsalicylimino)zirconium(IV)dibenzyl;
bis(N-iso-propyl-3,5-di-t-octylsalicylimino)zirconium(IV)dibenzyl;
bis(N-iso-propyl-3,5-di-(1',1'-dimethylbenzyl)salicylimino)zirconium(IV)dibenzyl;
bis(N-iso-propyl-3,5-di-(1',1'-dimethylbenzyl)salicylimino)titanium(IV)dibenzyl;
bis(N-iso-propyl-3,5-di-(1',1'-dimethylbenzyl)salicylimino)hafnium(IV)dibenzyl;
bis(N-iso-butyl-3,5-di-(1',1'-dimethylbenzyl)salicylimino)zirconium(IV)dibenzyl;
bis(N-iso-butyl-3,5-di-(1',1'-dimethylbenzyl)salicylimino)zirconium(IV)dichloride;
bis(N-hexyl-3,5-di-(1',1'-dimethylbenzyl)salicylimino)zirconium(IV)dibenzyl;
bis(N-phenyl-3,5-di-(1',1'-dimethylbenzyl)salicylimino)zirconium(IV)dibenzyl;
bis(N-iso-propyl-3,5-di-(1'-methylcyclohexyl)salicylimino)zirconium(IV)dibenzyl;
bis(N-benzyl-3-t-butylsalicylimino)zirconium(IV)dibenzyl;
bis(N-benzyl-3-triphenylmethylsalicylimino)zirconium(IV)dibenzyl;
bis(N-iso-propyl-3,5-di-trimethylsilylsalicylimino)zirconium(IV)dibenzyl;
bis(N-iso-propyl-3-(phenyl)salicylimino)zirconium(IV)dibenzyl;
bis(N-benzyl-3-(2',6'-di-iso-propylphenyl)salicylimino)zirconium(IV)dibenzyl;
bis(N-benzyl-3-(2',6'-di-phenylphenyl)salicylimino)zirconium(IV)dibenzyl;
bis(N-benzyl3-t-butyl-5-methoxysalicylimino)zirconium(IV)dibenzyl;
bis(2-(2H-benzotriazol-2-yl)-4,6-di-t-amylphenoxide)zirconium(IV)dibenzyl;
bis(2-(2H-benzotriazol-2-yl)-4,6-di-t-amylphenoxide)zirconium(IV)dichloride;
bis(2-(2H-benzotriazol-2-yl)-4,6-di-t-amylphenoxide)zirconium(IV)di(bis(dimethylamide));
bis(2-(2H-benzotriazol-2-yl)-4,6-di-(1',1'-dimethylbenzyl)phenoxide)zirconium(IV)dibenzyl;
bis(2-(2H-benzotriazol-2-yl)-4,6-di-t-amylphenoxide)titanium(IV)dibenzyl;
bis(2-(2H-benzotriazol-2-yl)-4,6-di-(1',1'-dimethylbenzyl)phenoxide)titanium(IV)dibenzyl;
bis(2-(2H-benzotriazol-2-yl)-4,6-di-(1',1'-dimethylbenzyl)phenoxide)titanium(IV)dichloride;
bis(2-(2H-benzotriazol-2-yl)-4,6-di-(1',1'-dimethylbenzyl)phenoxide)hafnium(IV)dibenzyl;
(N-phenyl-3,5-di-(1',1'-dimethylbenzyl)salicylimino)zirconium(IV)tribenzyl;
(N-(2',6'-di-iso-propylphenyl)-3,5-di-(1',1'-dimethylbenzyl)salicylimino)zirconium(IV)tribenzyl;
(N-(2',6'-di-iso-propylphenyl)-3,5-di-(1',1'-dimethylbenzyl)salicylimino)titanium(IV)tribenzyl; and
(N-(2',6'-di-iso-propylphenyl)-3,5-di-(1',1'-dimethylbenzyl)salicylimino)zirconium(IV)trichloride.

20. The composition of claim 12 wherein at least one of the two or more different catalyst compounds comprises a catalyst compound represented by the formula:

[(2,4,6-(CH$_3$)$_3$C$_6$H$_2$)NCH$_2$CH$_2$]$_2$NH}MBz$_2$(where M is Hf, Zr, Ti, and Bz is a halide or a benzyl group).

21. The method of claim 1 wherein at least one of the two or more different catalyst compounds comprises a Group 15 containing catalyst compound represented by the formulae:

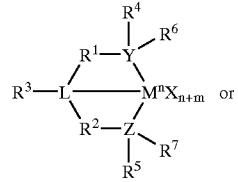

Formula I

-continued

Formula II

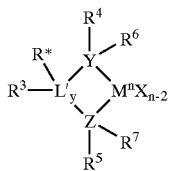

wherein

M is a Group 4, 5, or 6 metal;

each X is independently an anionic leaving group;

y is 0 or 1; and when y is 0 group L' is absent;

n is the oxidation state of M;

m is the formal charge of the ligand represented by YZL or the YZL';

L is a Group 15 or 16 element;

L' is a Group 15 or 16 element or Group 14 containing group;

Y is a Group 15 element;

Z is a Group 15 element;

divalent groups $R^1$ and $R^2$ are independently a $C_1$ to $C_{20}$ hydrocarbon group or a heteroatom containing group having up to twenty carbon atoms, the heteroatom selected from silicon, germanium, tin, lead, halogen and phosphorus; $R^1$ and $R^2$ may also be interconnected to each other;

$R^3$ is absent or a hydrocarbon group, hydrogen, a halogen, or a heteroatom containing group;

$R^4$ and $R^5$ are independently an alkyl group, an aryl group, substituted aryl group, a cyclic alkyl group, a substituted cyclic alkyl group, a cyclic arylalkyl group, a substituted cyclic arylalkyl group or multiple ring system; $R^4$ and $R^5$ may be interconnected to each other;

$R^6$ and $R^7$ are independently absent, or hydrogen, an alkyl group, halogen, heteroatom or a hydrocarbyl group; and R* is absent, or is hydrogen, a Group 14 atom containing group, a halogen, or a heteroatom containing group.

22. The composition of claim 12 wherein at least one of the two or more different catalyst compounds comprises a Group 15 containing catalyst compound represented by the formulae:

Formula I

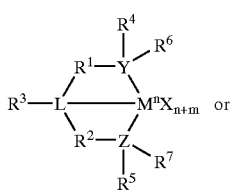

Formula II

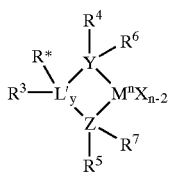

wherein

M is a Group 4, 5, or 6 metal;

each X is independently an anionic leaving group;

y is 0 or 1; and when y is 0 group L' is absent;

n is the oxidation state of M;

m is the formal charge of the ligand represented by YZL or the YZL';

L is a Group 15 or 16 element;

L' is a Group 15 or 16 element or Group 14 containing group;

Y is a Group 15 element;

Z is a Group 15 element;

divalent groups $R^1$ and $R^2$ are independently a $C_1$ to $C_{20}$ hydrocarbon group or a heteroatom containing group having up to twenty carbon atoms, the heteroatom selected from silicon, germanium, tin, lead, halogen and phosphorus; $R^1$ and $R^2$ may also be interconnected to each other;

$R^3$ is absent or a hydrocarbon group, hydrogen, a halogen, or a heteroatom containing group;

$R^4$ and $R^5$ are independently an alkyl group, an aryl group, substituted aryl group, a cyclic alkyl group, a substituted cyclic alkyl group, a cyclic arylalkyl group, a substituted cyclic arylalkyl group or multiple ring system; $R^4$ and $R^5$ may be interconnected to each other;

$R^6$ and $R^7$ are independently absent, or hydrogen, an alkyl group, halogen, heteroatom or a hydrocarbyl group; and R* is absent, or is hydrogen, a Group 14 atom containing group, a halogen, or a heteroatom containing group.

23. The method of claim 8 wherein the bulky ligand metallocene compound is selected from compounds represented by the following formulae:

$$L^A L^B M Q_n \text{ or } L^A A L^B M Q_n$$

wherein M is a Group 4, 5 or 6 metal;

each of $L^A$ and $L^B$ are bound to M and are independently selected from cyclopentadienyl and cyclopentadienyl-type ligands, each of which may be substituted or unsubstituted;

each Q is bound to M and is a leaving group; and

A is a divalent bridging group bound to each of $L^A$ and $L^B$.

24. The composition of claim 17 wherein the bulky ligand metallocene compound is selected from compounds represented by the following formulae:

$$L^A L^B M Q_n \text{ or } L^A A L^B M Q_n$$

wherein M is a Group 4, 5 or 6 metal;

each of $L^A$ and $L^B$ are bound to M and are independently selected from cyclopentadienyl and cyclopentadienyl-type ligands, each of which may be substituted or unsubstituted;

each Q is bound to M and is a leaving group; and

A is a divalent bridging group bound to each of $L^A$ and $L^B$.

* * * * *